United States Patent [19]

Cohen

[11] Patent Number: 5,574,677
[45] Date of Patent: Nov. 12, 1996

[54] ADAPTIVE NON-RESTORING INTEGER DIVIDE APPARATUS WITH INTEGRATED OVERFLOW DETECT

[75] Inventor: Earl T. Cohen, Fremont, Calif.

[73] Assignee: Exponential Technology, Inc., San Jose, Calif.

[21] Appl. No.: 344,179

[22] Filed: Nov. 23, 1994

[51] Int. Cl.⁶ .................. G06F 7/38; G06F 7/52
[52] U.S. Cl. ........................ 364/766; 364/745
[58] Field of Search ................... 364/715.04, 736, 364/737, 761, 764, 766, 736.5, 745

[56] References Cited

U.S. PATENT DOCUMENTS

| | | | |
|---|---|---|---|
| 4,891,780 | 1/1990 | Miyoshi | 364/766 |
| 4,992,969 | 2/1991 | Yamahata | 364/761 |
| 5,016,210 | 5/1991 | Sprague et al. | 364/766 |
| 5,097,435 | 3/1992 | Takahashi | 364/766 |
| 5,239,498 | 8/1993 | Girard | 364/764 |
| 5,301,139 | 4/1994 | Zinger | 364/767 |
| 5,317,531 | 5/1994 | Zaidi | 364/766 |
| 5,426,600 | 7/1995 | Nakagawa | 364/766 |

FOREIGN PATENT DOCUMENTS

| | | |
|---|---|---|
| 2266607 | 3/1993 | United Kingdom . |
| 2265739 | 6/1993 | United Kingdom . |

Primary Examiner—Roy N. Envall, Jr.
Assistant Examiner—Chuong D. Ngo
Attorney, Agent, or Firm—Stuart T. Auvinen

[57] ABSTRACT

The number of steps to perform integer division is reduced by combining detection of a remainder overflow with the final remainder restore step. When the sign bit of the partial remainder flips during the restore step, then there is no remainder overflow. However, when the sign bit does not change, then a remainder overflow is signaled. For signed division, the final quotient before a final complementation is also examined. This quotient should be a positive number since the dividend is initialized to a positive number, and the divisor is added or subtracted at each iteration assuming that it was a positive number. If the final quotient is negative, then an overflow is signaled except in a special case. If the quotient is the minimum integer, MININT, the most-negative number representable, and the expected sign is negative, then an overflow has not occurred. MININT is detected by ORing together the low bits in the quotient. This is detected in combinatorial logic without using the main adder in an ALU or using an additional step or clock cycle. Since remainder overflow detection is performed during the final remainder restore step, it is also accomplished without additional steps. Thus no additional steps are required for overflow detection. Both n-bit and 2n-bit dividends and signed and unsigned operations are supported.

17 Claims, 12 Drawing Sheets

OVERVIEW

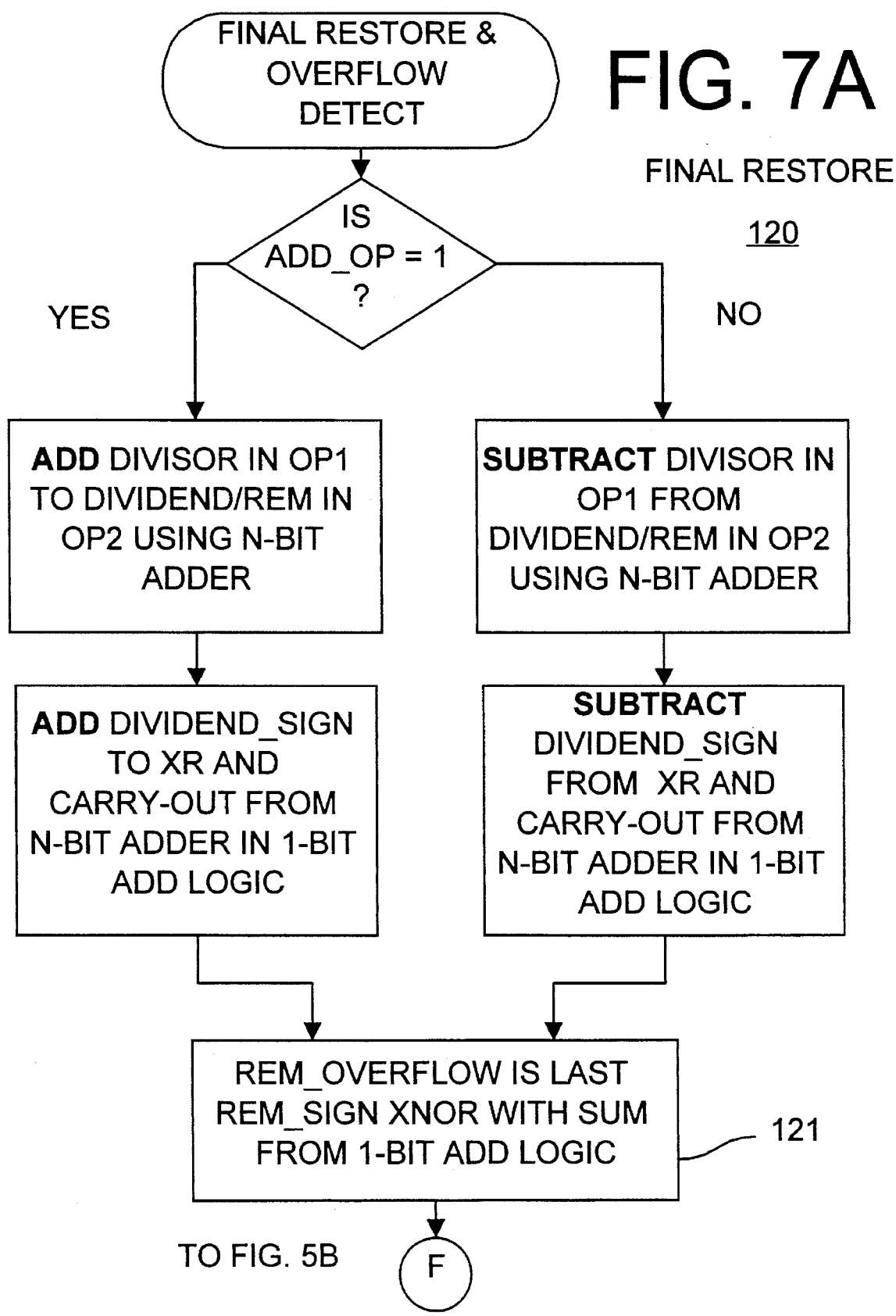

FINAL RESTORE

120

ADAPTIVE NON-RESTORING INTEGER DIVIDE APPARATUS WITH INTEGRATED OVERFLOW DETECT

BACKGROUND OF THE INVENTION

1. Field of the Invention

This invention relates to computer systems, and more particularly to an improved non-restoring division method and apparatus.

2. Description of the Related Art

Division is one of the more complex and lengthy operations performed in a digital processor. Many steps or iterations are needed—usually one iteration for each bit in the dividend. Like long division practiced by many schoolchildren, the divisor is subtracted from a partial remainder during each iteration. Binary arithmetic allows for non-restoring division to be used, where the partial remainder at any iteration is allowed to be negative as well as positive. Should the partial remainder be negative, then too large a number was subtracted. Restoring division would immediately add the divisor back to the partial remainder to restore the partial remainder to a positive number. However, non-restoring division skips this restore step.

For non-restoring division, on the iteration following a negative partial remainder, the divisor is added instead of subtracted. Since the divisor is effectively shifted to the right for each successive iteration, and in binary arithmetic each shift reduces the divisor by half (a right shift multiplies by $2^{-1}$ or ½), adding the divisor instead of subtracting is equivalent to not subtracting the divisor in the previous iteration (which would produce the negative remainder) and subtracting the divisor in the current iteration.

For example, suppose the divisor is 5, and the first iteration should not have subtracted five (−5), while the next iteration should subtract five, right-shifted, or half of five (−(½)*5). Instead, the next iteration adds the shifted five (+(½)*5) because the first iteration subtracted too much, producing a negative partial remainder. Adding five in the second step has the effect: $-5_{First\ Iter.} + (½)*5_{Second\ Iter.} = -(½)*5$. Restoring division would require an extra restore step: $-5_{First\ Iter.} + 5_{Restore} - (½)*5_{Second\ Iter.} = -(½)*5$. Non-restoring division reduces the number of steps required in a division operation because each of the partial remainders do not have to be restored to positive numbers. Instead, the correction is made in the next iteration by adding instead of subtracting.

While non-restoring division is well-known and often implemented, detection of overflow conditions may require additional steps, especially when both signed and unsigned division are to be performed. Often additional steps at the beginning or end of a division operation are used to test or determine if an overflow will or has occurred. Additionally, the dividend may be either the same width (n-bits) as the divisor, quotient, and remainder, or the dividend may be twice the width (2n-bits). The dividend and the divisor are usually converted to positive numbers in separate steps before the division is performed, and two separate final restore steps after the division finishes are used to ensure that the final remainder is positive.

What is desired is an apparatus to detect overflow and perform division in fewer steps and in a simpler fashion than in prior systems, and an apparatus to detect overflow for both signed and unsigned division without extra steps. It is also desired to have a division apparatus that can operate on both n-bit and 2n-bit dividends.

SUMMARY OF THE INVENTION

The number of steps to perform integer division is reduced by combining detection of a remainder overflow with the final remainder restore step. When the sign bit of the partial remainder flips during the restore step, then there is no remainder overflow. However, when the sign bit does not change, then a remainder overflow is signaled.

An overflow detection apparatus detects a remainder overflow in an integer division sequence of a dividend that is to be divided by a divisor. The integer division sequence has a plurality of iterations and includes a last iteration. The last iteration produces a last partial remainder that has a last remainder sign. The last remainder sign is positive or negative. The overflow detection apparatus comprises a final restore means, which receives the last partial remainder and the last remainder sign. It is for restoring the last partial remainder, and it subtracts an absolute value of the divisor from the last partial remainder and outputs the difference as a result if the last remainder sign is positive. The final restore means adds the absolute value of the divisor to the last partial remainder and outputs the sum as the result if the last remainder sign is negative. The result has a result sign indicating if the result is positive or negative.

A select means receives the result from the final restore means and the last remainder sign, and selects as a final remainder the result from the final restore means if the last remainder sign is negative, but it selects as the final remainder the last partial remainder if the last remainder sign is positive. An overflow detect means receives the last remainder sign and the result sign, and it signals the remainder overflow when the last remainder sign and the result sign are both positive or both negative.

Thus the remainder overflow is detected from the result sign of the final restore means and the last remainder sign.

In further aspects the invention uses adaptive division. The divisor is added or subtracted on each iteration based on both the sign of the partial remainder and the sign of the divisor. When the divisor is negative, the opposite of the standard operation is performed. This saves the initial step of selectively complementing the divisor when the divisor is negative.

For adaptive division, a divisor sign means stores a divisor sign. The divisor sign is negative to indicate that the divisor is a negative signed number, but positive to indicate that the divisor is a positive signed number or an unsigned number. An operation type means receives the divisor sign and indicates if the divisor should be added or subtracted in a next iteration. The operation type means indicates that the divisor should be subtracted if the divisor sign and a current sign of a partial remainder in a current iteration are both positive or both negative.

A shift means shifts the partial remainder in the current iteration to the left by one bit-position, producing a shifted partial remainder. An iteration means is coupled to the operation type means and receives the shifted partial remainder. It calculates a next partial remainder. The next partial remainder is the difference between the partial remainder and the divisor if the operation type means indicates that the divisor be subtracted, but the next partial remainder is the sum of the partial remainder and the divisor if the operation type means indicates that the divisor be added.

Thus the divisor sign is used to determine if the divisor is added or subtracted during each iteration, eliminating the need to complement a negative divisor during initialization. The operation type means can be simply an exclusive-OR (XOR) gate receiving the divisor sign and the current sign of the partial remainder in the current iteration. For unsigned division, the divisor sign must be forced to be positive regardless of the value of the actual divisor sign bit.

In other aspects of the invention the apparatus has a divisor sign which is negative if the divisor is a negative signed number, but positive if the divisor is a positive signed number or an unsigned number. A dividend sign is negative if the dividend is a negative signed number, but positive if the dividend is a positive signed number or an unsigned number. An expected quotient sign is positive if the divisor sign and the dividend sign are both positive or both negative. A quotient overflow detect means receives a last quotient from the last iteration, and signals a quotient overflow if:

(a) the last quotient is negative, and (b) signed division is performed, and (c) a special case is not indicated.

A special case indicating means receives the expected sign of the quotient and the last quotient. It indicates the special case when the expected sign is negative and the last quotient is a minimum signed integer representable, MININT. The minimum signed integer representable is a number that has a binary one as the most-significant bit and all other binary bits are zero. Overflow for signed integer division occurs if either the remainder overflow or the quotient overflow is signaled.

Using these aspects of the invention, overflow can be detected as either a remainder overflow or a quotient overflow. Both types of overflow require no additional steps. The remainder overflow is combined with the final remainder restore step while the quotient overflow is performed in logic by checking the value of the quotient from the last iteration. Adaptive division allows the initial step to complement a negative divisor to be eliminated. Instead, the add or subtract operation for each iteration is reversed when the divisor is negative. Thus the invention performs division and overflow checking with fewer steps.

In other aspects of the invention the same algorithm is used for both signed and unsigned division, except that the initial treatment of the dividend differs for unsigned division. Also for unsigned division, the divisor sign is forced to zero, and the quotient overflow step is modified.

BRIEF DESCRIPTION OF THE DRAWINGS

FIGS. 7A and 7B are a flowchart of the final restore and overflow detect step.

DETAILED DESCRIPTION

Figure 1:
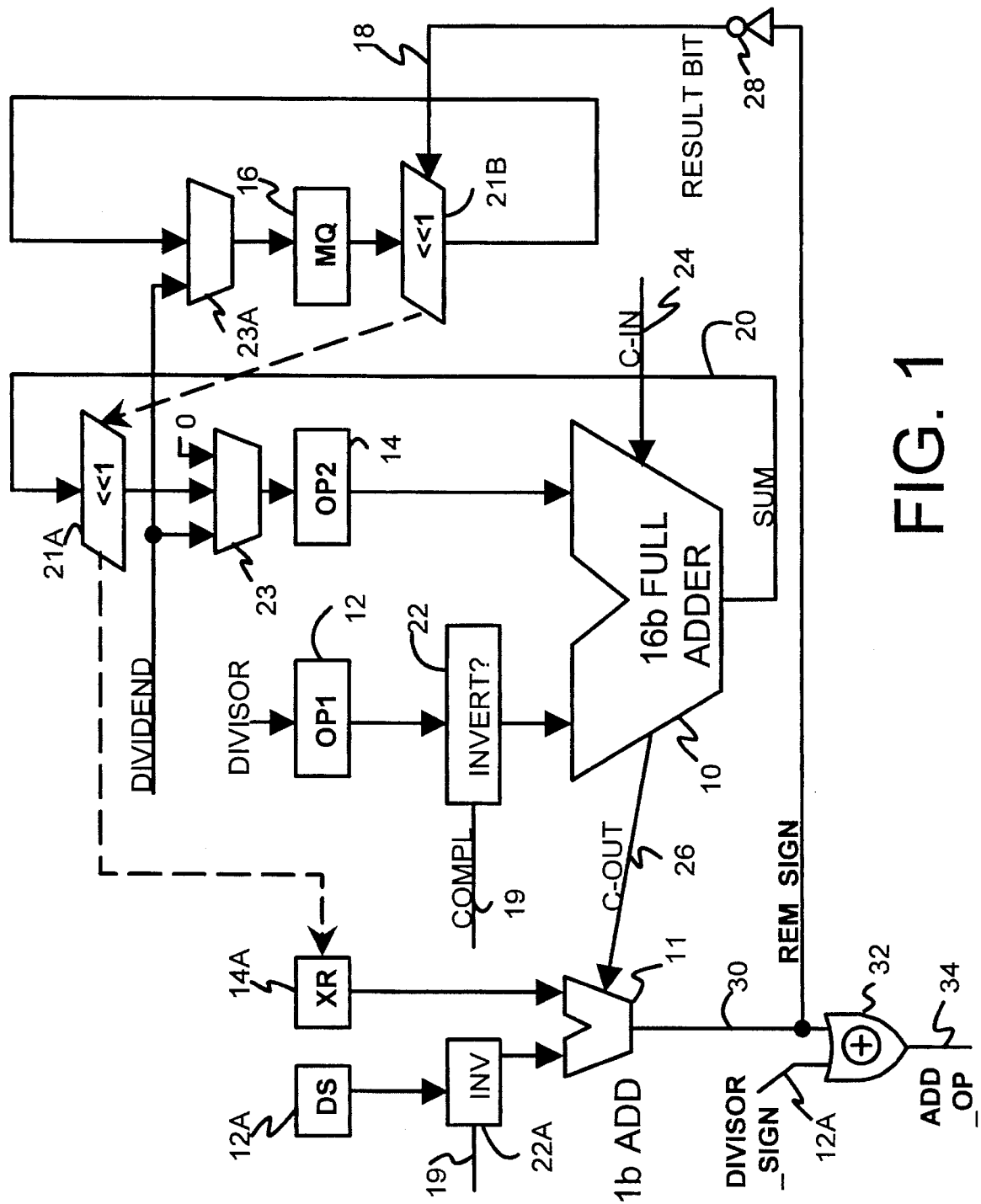
FIG. 1 shows an ALU adapted for performing integer division.

The present invention relates to an improvement in division. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Overview of the Invention

The number of steps needed to perform integer division can be reduced by combining some of the steps together and taking advantage of certain characteristics of the arithmetic-logic-unit (ALU) that is used to perform the division in a processor. In the present invention, one of the overflow detection steps is combined with the final remainder restore step. Other overflows are detected in logic without requiring that extra steps be added. Thus overflow detection in the present invention requires no extra steps.

Both n-bit and 2n-bit dividends can be supported by initializing the divide apparatus appropriately. The initialization step can be combined with selectively complementing the dividend so that the dividend is a positive number before division starts.

The division is adaptive because the divisor is added or subtracted on each iteration based on both the sign of the partial remainder, as with standard non-restoring division, and the sign of the divisor. When the divisor is negative, the opposite of the standard operation is performed. This saves the initial step of selectively complementing the divisor when the divisor is negative so that a positive divisor is always used in the actual division. The sign of the divisor is stored and used to invert the conventional division algorithm's add or subtract operation at each iteration.

Both signed and unsigned types of division are supported by storing the sign bits and the type of division. Overflow detection is simplified for unsigned division by merely detecting that the final remainder has overflowed. The remainder overflow detection is accomplished by examining the sign bit during the final remainder restore step. When the sign bit of the partial remainder flips during the restore step, then there is no remainder overflow. However, when the sign bit does not change, then the restore step has detected an overflow. Essentially, the final remainder restore step, which adds or subtracts the divisor, was not sufficient to change the sign because the remainder was greater than the divisor.

For signed division, a quotient overflow can also be detected by examining the final quotient before a final complementation. This quotient should always be a positive number since the dividend was initialized to be a positive number, and the divisor was added or subtracted at each iteration assuming that it was a positive number. If the final quotient is negative, then an overflow has possibly occurred. If the expected quotient was positive, then an overflow has definitely occurred. However, if the expected quotient was negative, then a special case may have occurred that is not an overflow.

This special case occurs when the quotient is the minimum integer, MININT, which is the most-negative number representable. The two's complement number system can represent most numbers as either a positive or a negative number. However, MININT can only be represented as a negative number. For binary numbers represented in two's complement format, the most-significant-bit (MSB) is the sign bit, with a one representing negative numbers and a zero representing positive numbers. Thus for 4-bit numbers, 0000 is zero, 0001 is one, 0010 is two, and 0111 is seven, the largest positive number. Negative one is 1111, negative two is 1110, negative seven is 1001. Although positive eight cannot be represented, negative eight can be represented as 1000. Thus negative eight is MININT for 4-bit representation in two's complement.

When the expected sign is negative and the quotient is MININT, then an overflow has not occurred. However, if the expected sign is positive, then an overflow has occurred when the quotient is MININT, since MININT cannot be represented as a positive number. Taking the two's complement of MININT yields MININT again, just as taking the two's complement of zero yields zero again.

MININT can be detected by ORing together the low bits in the quotient. If all of these low bits are zero, and the MSB sign bit is one, then the quotient is MININT. Since quotient overflow is detected merely by examining the quotient and the expected sign for the answer, quotient detection can be accomplished in combinatorial logic without using the main adder in an ALU or using an additional step or clock cycle. Thus quotient detection is accomplished without adding any additional steps. Since remainder overflow detection is performed during the final remainder restore step, it likewise is accomplished without adding any additional steps. Thus the present invention requires no additional steps for overflow detection. All possible overflow cases for either signed or unsigned division are detected by the remainder overflow or the quotient overflow.

DIVISION APPARATUS

Integer division is often executed in the processor's general-purpose ALU. FIG. 1 shows an ALU adapted for performing integer division. The ALU has an adder 10 which is used for each iteration. OP1 register 12 is loaded with the divisor while OP2 register 14 is loaded by mux 23 with the upper half of a 2n-bit dividend and MQ register 16 is loaded by mux 23A with the lower half of a 2n-bit dividend, or an n-bit dividend. For n-bit dividends, mux 23 loads zeros into OP2 register 14. If the dividend is negative, it is first complemented before being loaded into registers 14, 16. This selective complementation can be performed by adder 10 in a separate initial step. Since adder 10 is only n bits wide, the divisor in OP1 register 12 is added to or subtracted from only the upper n bits of the dividend in OP2 register 14. Shifter 21A and 21B shift the dividend being loaded into OP2 register 14 and MQ register 16 to the left by one bit for each iteration, so that the lower n bits of the dividend in MQ register 16 are successively shifted into OP2 register 14 so that they can be operated upon by adder 10. Each upper bit of the dividend in OP2 register 14 is successively shifted out of shifter 21A and discarded after being operated upon by adder 10. A result bit 18, which represents a bit in the quotient, is shifted into the bottom of shifter 21B for each iteration. Thus upon completion of all the iterations of the entire division operation, MQ register 16 will contain the quotient and OP2 register 14 will contain the remainder.

The sum 20 produced by adder 10 represents the partial remainder for each iteration. This sum 20 is returned to shifter 21A and shifted up by one bit-position. The shifted sum is loaded into OP2 register 14 for use in the next iteration. Inversion logic 22 selectively inverts the divisor from OP1 register 12 when the divisor is to be subtracted, and the divisor is a positive number. However, if the divisor is a negative number, the inversion logic 22 must invert the divisor from OP1 register 12 when the divisor is to be added.

Inversion logic 22 may be constructed as a bank of exclusive-OR (XOR) gates and performs a one's complement of the divisor when complement signal 19 is active. To convert this one's complement to the two's complement, the number +1 must be added. This +1 can be supplied as the carry-in input 24 to adder 10. Thus when inversion logic 22 inverts the divisor, carry-in input 24 is also active, with the net result that the two's complement of the divisor from OP1 register 12 is added to the upper n bits of the dividend or partial remainder from OP2 register 14.

Extra Bit Needed for Adder

Because the partial remainders can be negative or positive, non-restoring integer division requires one additional bit over the width of the divisor. Thus an n-bit divisor requires that an n+1 bit adder be used. Since most ALU's are designed to have a fixed width that is often equal to the width of registers such as OP1 register 12, the standard adder 10 available will be only n bits wide. While adder 10 could be extended to have n+1 bits, this is expensive. Usually the extra adder bit is constructed from logic near or in the ALU but separate from the adder 10. In the preferred embodiment, a one-bit adder 11 is constructed from logic gates for adding the upper, or most-significant bit (MSB), of an n+1 bit addition. One-bit adder 11 receives as inputs the MSB of the divisor, the divisor sign bit 12A, and the MSB of the dividend, referred to as XR bit 14A. XR bit 14A may be loaded by a shift from the highest (MSB) bit of the sum 20 by shifter 21A.

Divisor sign bit 12A may also be selectively inverted by inversion logic 22A when inversion logic 22 inverts the divisor. Complement signal 19 indicates that both inversion logic 22 and 22A invert. Carry-in 24 may also be high when complement signal 19 is high to perform two's complement inversion. Inversion logic 22A may be a simple exclusive-OR (XOR) gate. The carry-out 26 from adder 10 is tied to the carry-in input of one-bit adder 11.

The output of one-bit adder 11 is the remainder sign bit 30 which is the sign bit for the sum 20. When the partial sum of an iteration output as sum 20 has a positive sign (remainder sign bit 30 is zero), then the divisor was properly subtracted and the quotient bit should be a one. Inverter 28 inverts remainder sign bit 30 to generate result bit 18, a bit in the quotient that will be shifted into the bottom of shifter 21B.

When the remainder sign bit 30 is one, then the partial remainder represented by sum 20 is negative, and the divisor should not have been subtracted for that iteration. In this case the quotient bit should be a zero. Inverter 28 again inverts remainder sign bit 30 to generate result bit 18, which will be shifted into the bottom of shifter 21B. The operation for the next iteration must be an add rather than a subtract in order to effectively restore the partial remainder during the next iteration. Thus remainder sign bit 30 is input to XOR gate 32 to generate add operation signal 34 (ADD_OP). The sign of the divisor 12A is also input to XOR gate 32. Thus if the divisor is positive, then XOR gate 32 merely passes remainder sign bit 30 through to add operation signal 34, as with standard non-restoring division. When the remainder sign bit 30 is positive (zero), then the next iteration will subtract the positive divisor since ADD_OP will be zero. When the remainder sign bit 30 is negative (one), then the next iteration will add the positive divisor since ADD_OP will be one.

Adaptive Division Allows Divisor to be Negative or Positive

However, when the divisor is negative, then XOR gate 32 inverts remainder sign bit 30 to generate add operation signal 34. When the remainder sign bit 30 is negative (one), then the next iteration will subtract the negative divisor since ADD_OP will be zero. Subtracting the negative divisor is equivalent to adding the absolute value of the negative divisor. When the remainder sign bit 30 is positive (zero), then the next iteration will add the negative divisor since ADD_OP will be one. This has the same effect as subtracting the absolute value of the divisor.

Thus XOR gate 32 allows the divisor in OP1 register 12 to be either positive or negative. This eliminates the need to initially complement a negative divisor, saving a step. XOR gate 32 allows the division to adapt to either positive or negative divisors by inverting the type of operation that would be performed in each iteration. The fact that most standard ALU's can both add and subtract is used to reduce the initialization required for the division.

OVERVIEW OF DIVISION STEPS—FIG. 2

Figure 2:
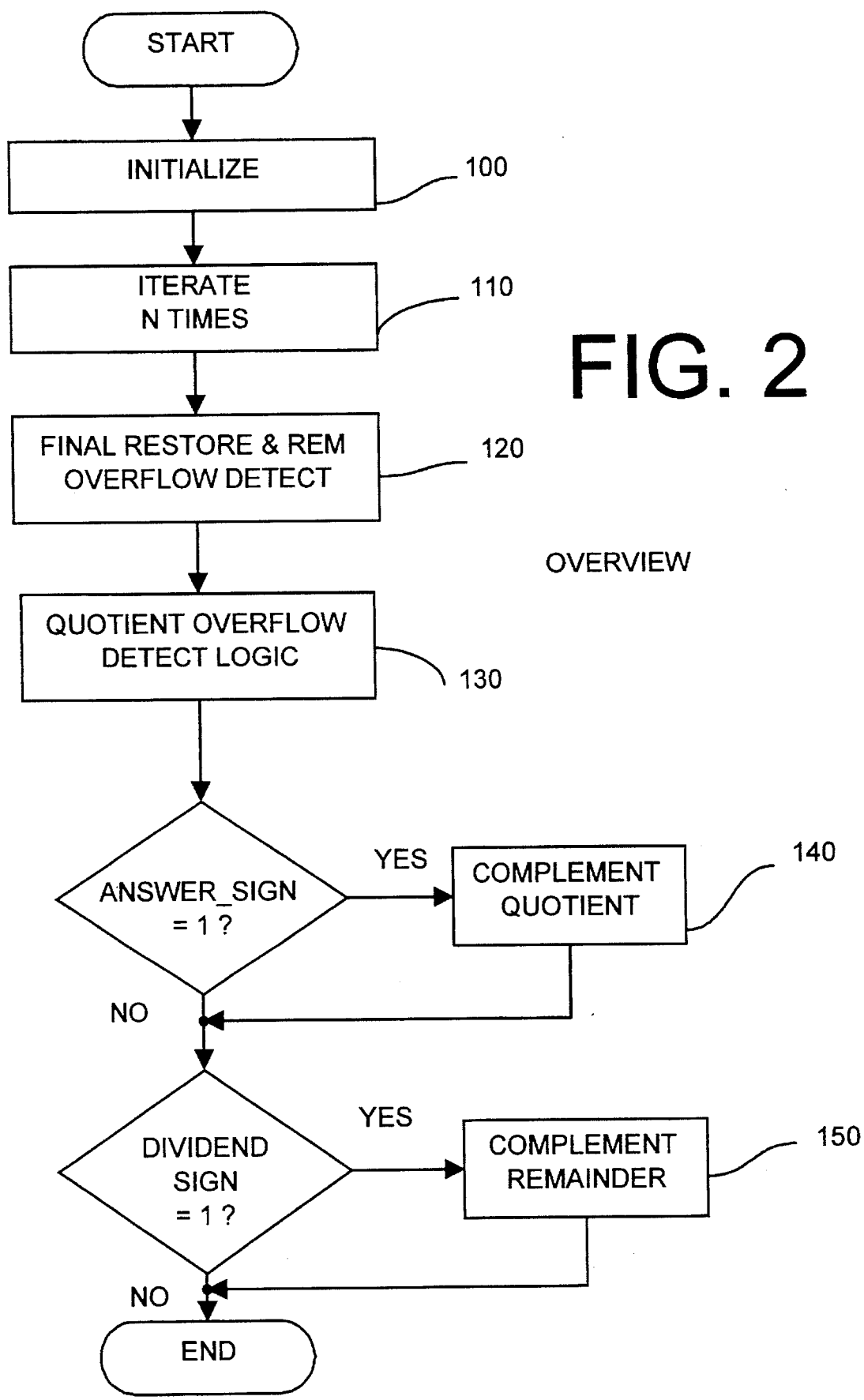
FIGS. 2 is a flowchart of the basic steps in the division process of the present invention.

FIG. 2 is a flowchart of the basic steps in the division process of the present invention. An initialization sequence of steps 100 includes determining the signs of the inputs and outputs, and selectively complementing the dividend to a positive number as it is loaded into the MQ and OP2 registers. The divisor is loaded into the OP1 register without any complementation. Iterations 110 successively add or subtract the divisor from the dividend and partial remainders. A bit of the quotient is calculated during each iteration. Since a non-restoring algorithm is used, the partial remainder after the last iteration may be negative. This negative partial remainder is complemented during the final restore and remainder overflow detect step 120. This step 120 is also used to detect a remainder overflow. A quotient overflow is detected at step 130, which may occur during another step such as 140 so that quotient overflow does not require any extra time. The quotient is complemented in step 140 if the expected sign of the quotient answer is negative, and the remainder is also complemented in step 150 if the dividend was negative. Each of these steps 100–150 will next be described in more detail.

INITIALIZATION—FIG. 3

Prior-art systems have converted both the dividend and the divisor to positive numbers before proceeding with the division itself. This simplifies the division process because the subtraction operation in each of the iterations can be performed without regard to the signs of the dividend and divisor. The signs of these inputs are saved and the sign of the final quotient and remainder can be calculated. The quotient is selectively complemented after the division is complete if the quotient should be negative. Likewise, the remainder is selectively complemented if the original dividend, and hence the remainder, is negative.

The inventor has realized that the division process can still be simple and rapid if the divisor is not selectively complemented during initialization. This is so because the divisor can be both added and subtracted from the partial remainders in non-restoring division. Thus it is irrelevant whether the divisor is initially converted to a positive number, or left as a negative number. The adder in most arithmetic-logic-units (ALU's) is capable of complementing an input; thus the divisor may be complemented as needed during each individual iteration. This complementation is performed whenever the operation to be performed does not match the sign of the divisor. Thus when a subtract operation is to be performed in an iteration and the divisor is negative, no complementation is needed. But when addition is to be performed, the negative divisor must be complemented.

Figure 3A:
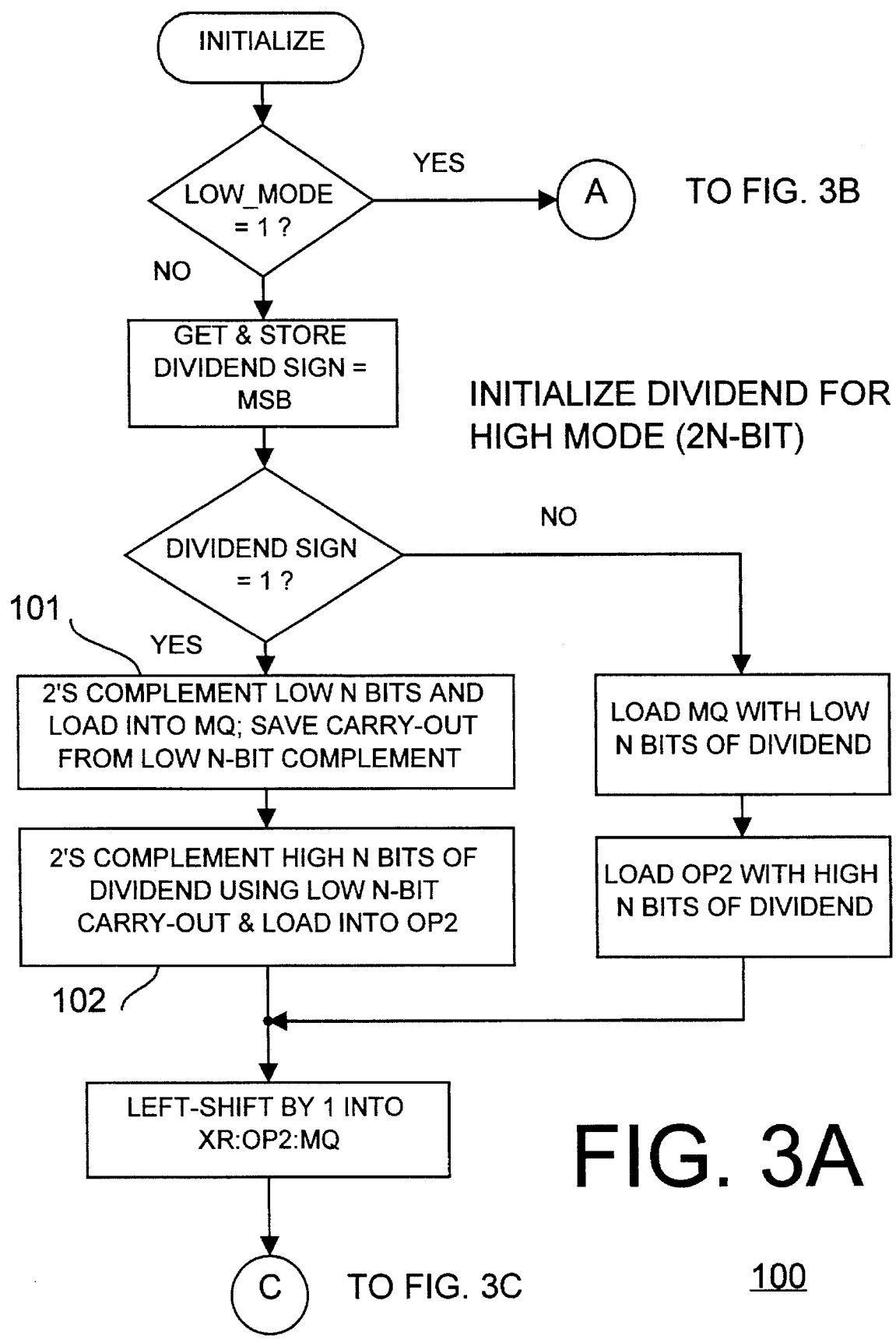
FIGS. 3A, 3B, and 3C detail steps in the initialization sequence 100 of the division apparatus.
Figure 3B:
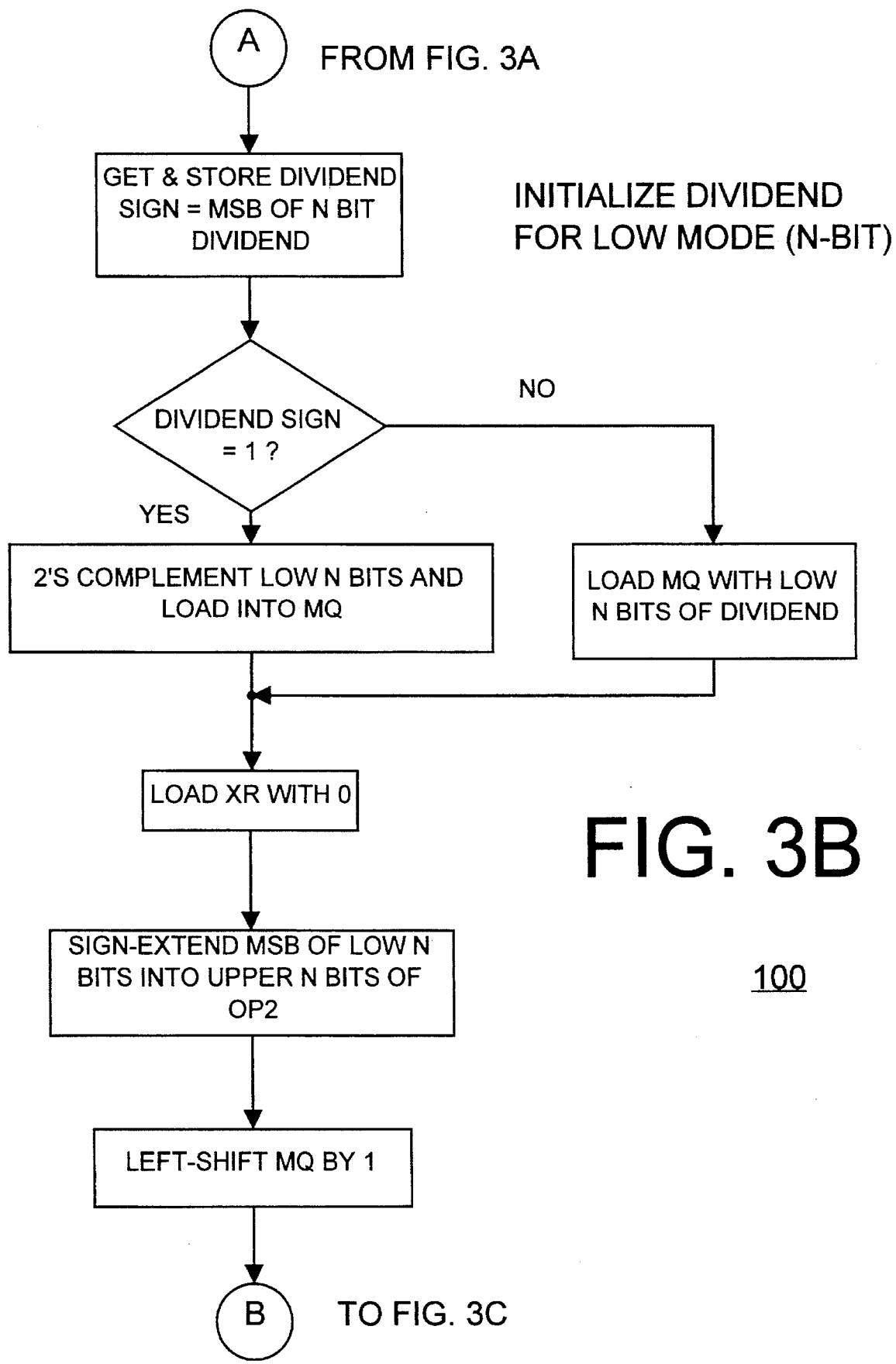
Figure 3C:
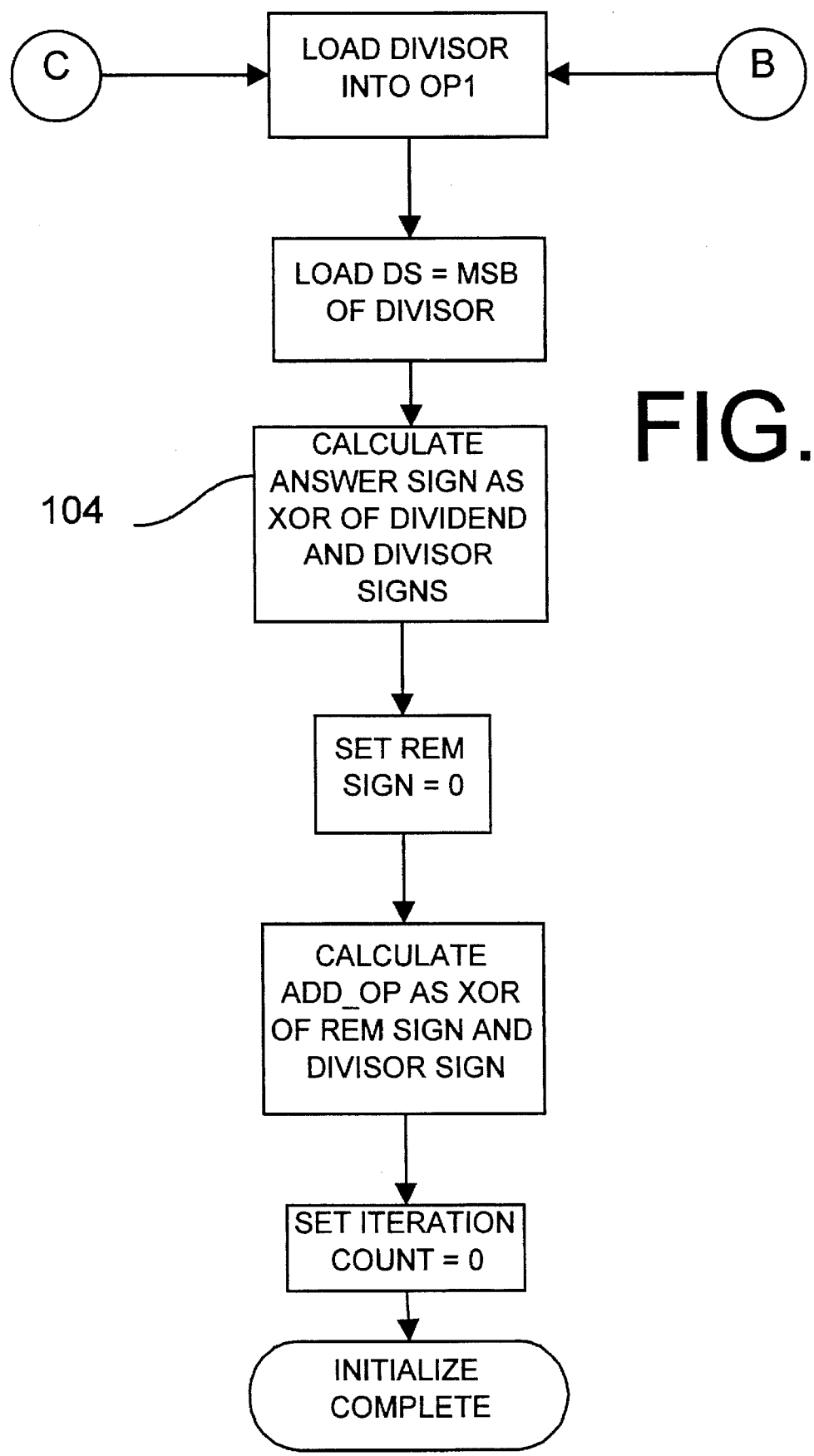

FIGS. 3A, 3B, and 3C detail steps in the initialization sequence 100 of the division apparatus. Apparatus references are from FIG. 1. An unsigned parameter is high to indicate that unsigned division is to be performed, but low to indicate signed division. A high unsigned parameter forces the divisor sign to be zero. A low_mode parameter is low when n-bit division is to be performed, and high when a 2n-bit dividend is used. For 2n-bit dividends, the sign, DIVIDEND_SIGN, is obtained from the most-significant-bit (MSB) of the dividend. This sign is stored for later use. If the sign is zero, indicating that the dividend is positive, then register MQ is loaded with the low n bits of the dividend and register OP2 is loaded with the high n bits of the dividend. When the sign of the dividend is one, indicating a negative dividend, then this negative dividend is first complemented to yield a positive dividend for use in the iterations 110. This complementation is a 2-step process because a 2n-bit number is to be complemented in an n-bit adder. First, in step 101, the low n bits of the dividend are complemented using inversion logic 22 and adder 10 of FIG. 1, and the result is loaded into MQ register 16. The carry-out from this step 101 is saved and used as the carry-in input 24 to adder 10 during the second step 102. The second step 102 takes the two's complement of the upper n bits of the dividend by using the saved carry-out from the first step 101 and asserting complement signal 19 to inversion logic 22. The result is then loaded into OP2 register 14.

The dividend in the OP2 and MQ registers is shifted up by one bit-position and the MSB of the OP2 register is shifted to the XR bit 14A. This occurs regardless of the sign of the dividend. It does not require a separate clock cycle; the result from the adder can be shifted and loaded into OP2 and MQ registers in the same clock period as the ALU operation itself. Muxes (not shown) can be used to load the shifted output from the adder rather than the unshifted output. Thus several "steps" can occur within a single clock cycle.

FIG. 3B details the initialization steps when the low_mode parameter is one, indicating that the dividend is only n-bits wide. Again the dividend sign is determined from the MSB of the dividend, which is only n bits instead of 2n bits as in FIG. 3A. If the dividend sign is a one, and the dividend is negative, then the low n bits of the dividend are complemented and loaded into MQ register 16. Otherwise, when the dividend sign is zero, the dividend may just be loaded directly into the MQ register without complementation.

The XR bit is then loaded with a zero, since the 2n-bit dividend must be positive after the selective complementation. Since the dividend is always positive at this point, zeros will always be loaded into the OP2 register during this load. Finally the MQ and OP2 registers are shifted to the left by one bit-position.

FIG. 3C shows the other steps of initialization once the dividend has been loaded as shown in FIGS. 3A and 3B. The divisor is loaded into OP1 register 12 without any complementation. The divisor sign, DS 12A, is copied from the MSB of the divisor in OP1 register 12. This sign can be either positive or negative. The answer sign is calculated as the exclusive-OR (XOR) of the signs of the two inputs—the divisor and the dividend. The remainder sign, REM_SIGN, which is the sign of the partial remainders an each iteration, is initially set to zero. The initial type of operation, ADD_OP, is also calculated as the exclusive-OR of the remainder sign and the divisor sign DS. Since the divisor sign can be negative or positive, ADD_OP can indicate addition or subtraction for the first step. Addition initially occurs when the divisor is negative, while subtraction is indicated when the divisor is positive. Thus the first iteration will always reduce the dividend by the absolute value of the divisor. The iteration count is also set to zero.

ITERATIONS—FIG. 4

Figure 4A:
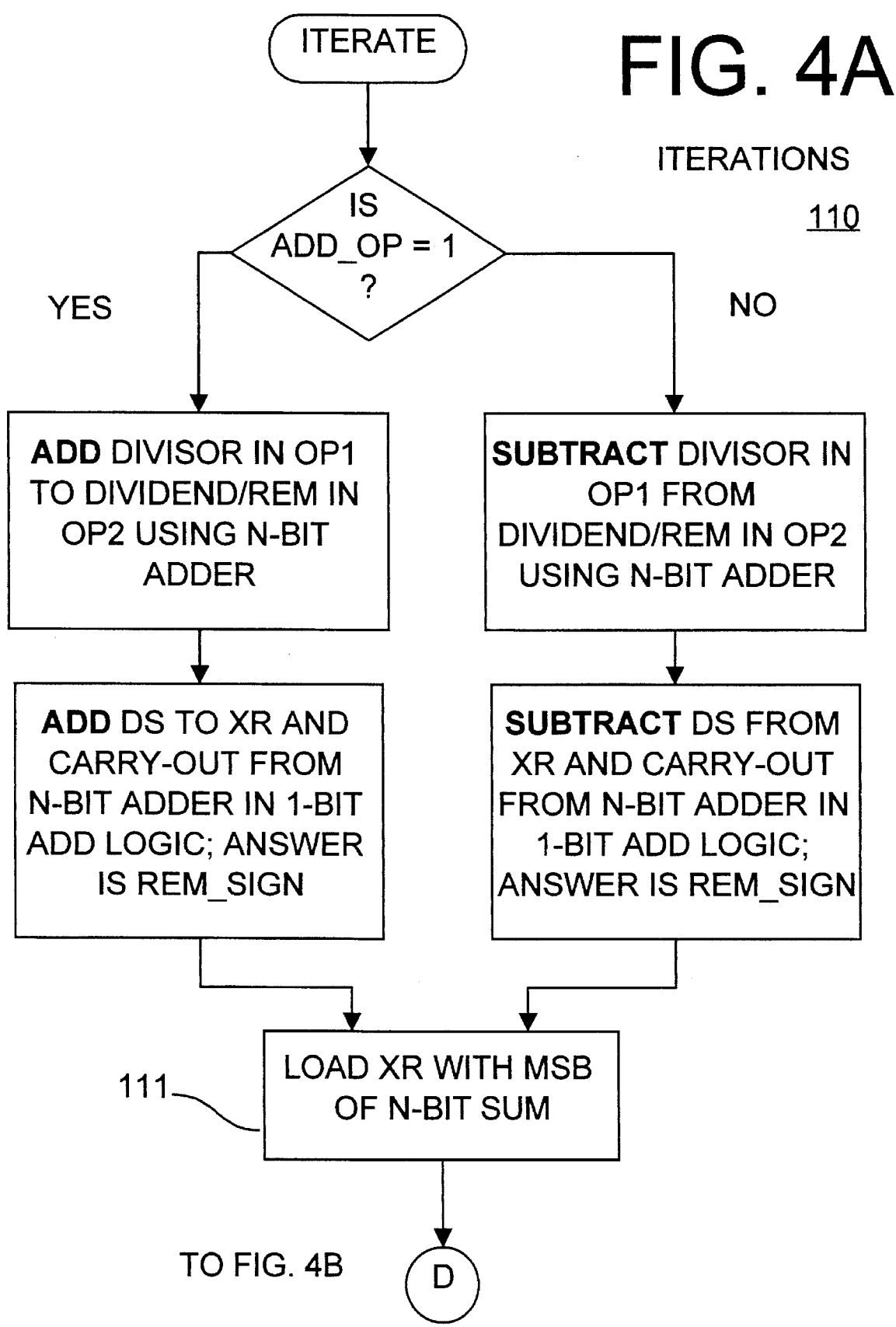
FIGS. 4A, 4B, and 4C shows the steps during the division iterations.
Figure 4B:
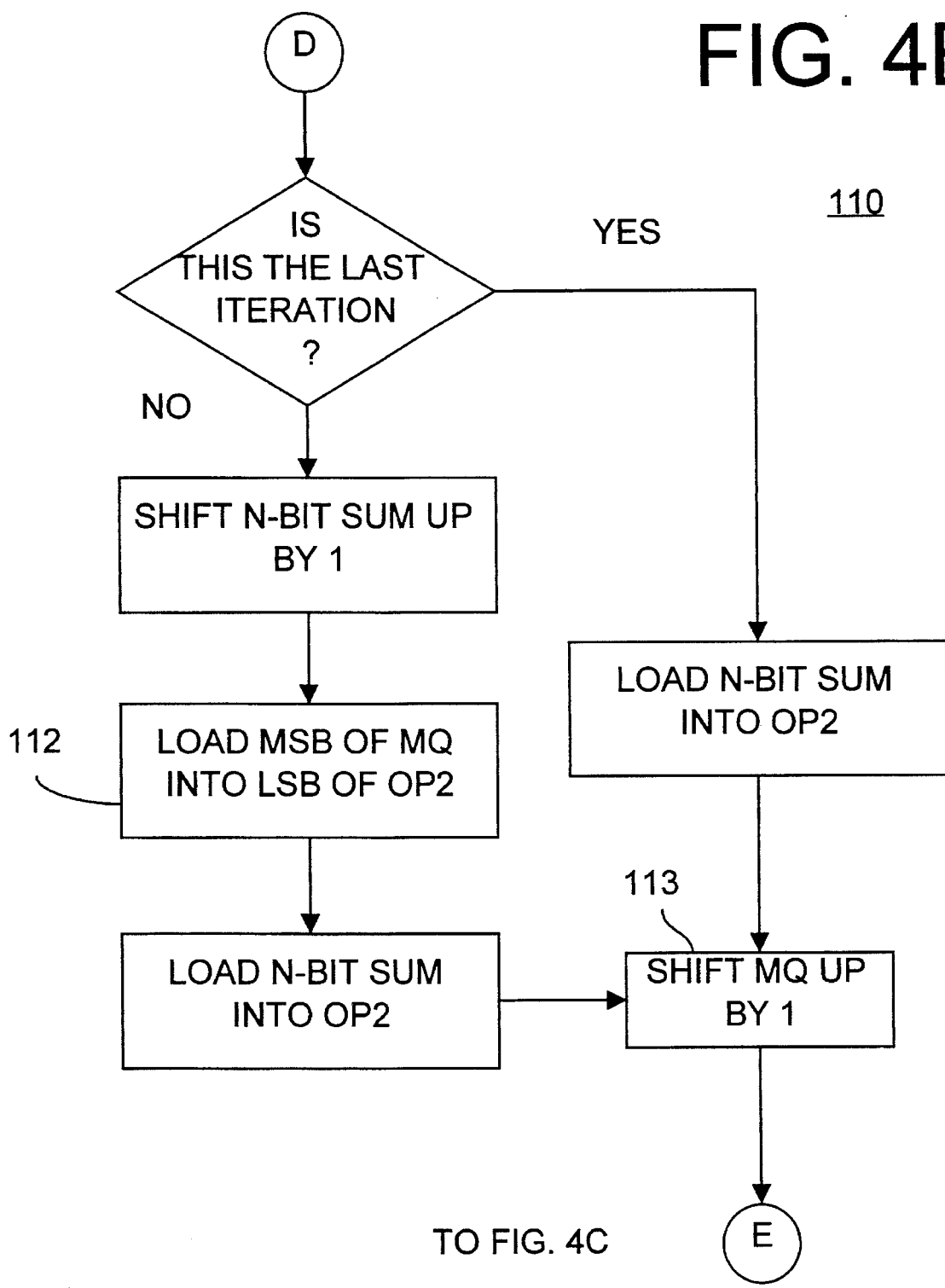
Figure 4C:
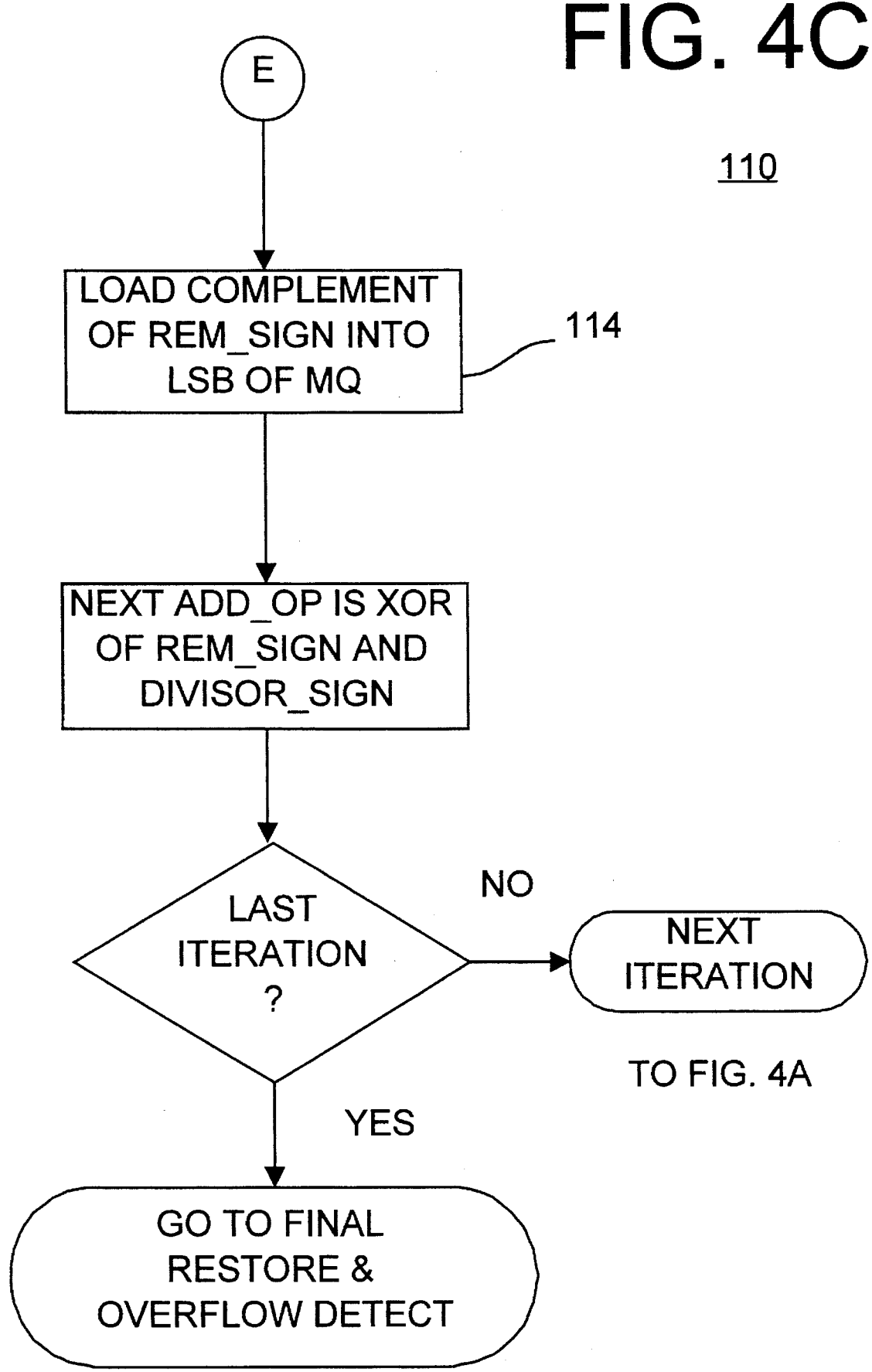

FIGS. 4A, 4B, and 4C show the steps during the division iterations. Several of these steps may occur during a single processor clock cycle. The type of operation parameter, ADD_OP, which was set during initialization or during the last iteration, determines whether the divisor in OP1 register 12 is added or subtracted from the dividend or partial remainder in OP2 register 14. When subtraction is indicated, then the carry-in input 24 and the complement signal 19 are asserted (high), causing inversion logic 22 and 22A to invert the divisor and divisor sign DS. The carry-in input 24 acts to add one to the result, effectively yielding an addition with the two's complement of the divisor. The adder 10 is used to add n bits, while the one-bit adder 11 adds the XR bit 14A and the divisor's sign, DS 12A to the carry-out 26 from n-bit adder 10. The result from the one-bit adder 11 is the new remainder sign REM_SIGN for the partial remainder that was just calculated by adder 10.

The new value for XR is the MSB of the n-bit partial remainder from adder 10, which is loaded in step 111 of FIG. 4A. For all iterations except the last one, the n-bit partial remainder (sum) from adder 10 is shifted up by one bit-position. The MSB of the MQ register is shifted to the least-significant-bit (LSB) of the OP2 register, step 112, while the n-1 bits of the n-bit sum that was shifted is loaded into the upper n-1 bits of OP2 register 14. The MQ register 16 is also left-shifted by one position, step 113. Thus the result from the adder is shifted up by one bit-position into the XR, OP2, and MQ registers. The LSB of the MQ register is then loaded with complement of the remainder sign in step 114, which becomes a bit in the quotient.

For the last iteration, the OP2 register is loaded with the partial remainder, but not shifted, while the MQ register is shifted and the complement of the remainder sign is loaded at step 114 into the LSB of the MQ register. This is shown in FIG. 4B and 4C.

The next value for the type of operation, ADD_OP, is determined as the exclusive-OR (XOR) of the partial remainder's sign, REM_SIGN, and the divisor's sign DS. If n iterations have not yet been performed, then another iteration is started. After all n iterations have completed the division proceeds to the final restore and remainder overflow step.

Figure 5:
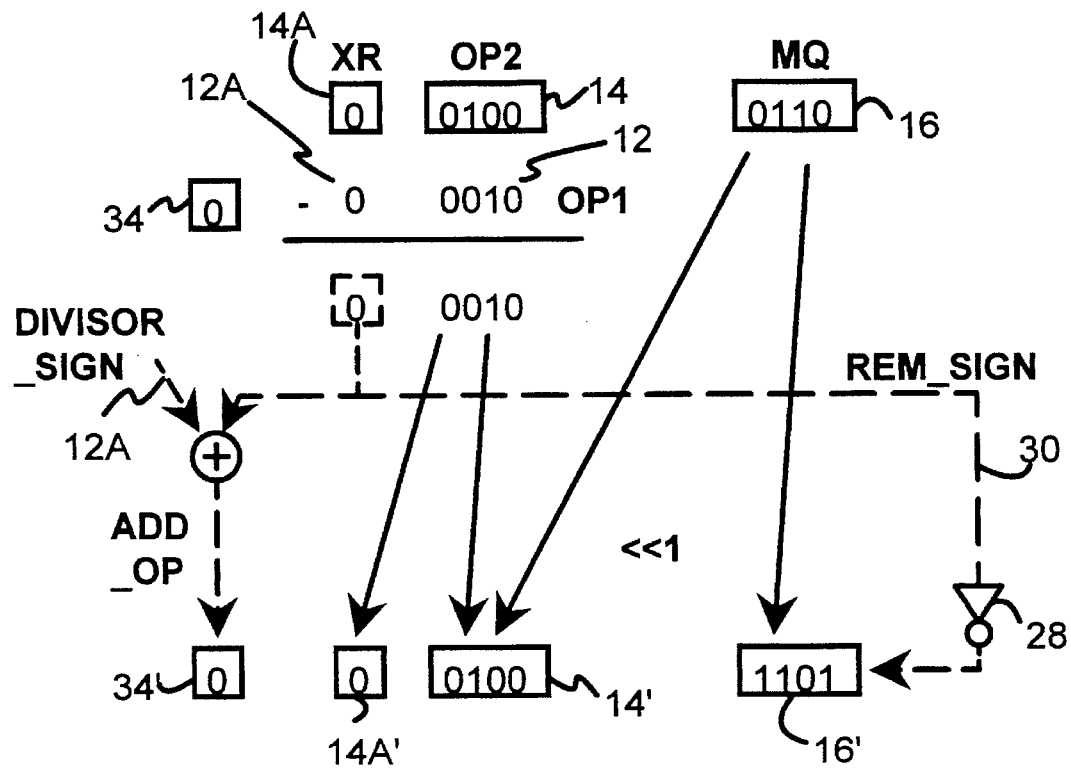
FIG. 5 is a diagram of an iteration illustrating the manipulation of the inputs.

FIG. 5 is a diagram of an iteration illustrating the manipulation of the inputs. A partial remainder "0100" (4) has been generated in a previous iteration and is stored in OP2 register 14. The sign of this partial remainder, "0", is stored as the XR bit 14A. The MQ register 16 contains the bits "0110" (6). The add operation signal 34 (ADD_OP) calculated in the last iteration was "0" which causes a subtraction of the divisor during the current iteration. This divisor, "0010" (2) is a positive number since its sign DS 12A is "0". Subtracting the divisor "0_0010" from the partial remainder "0_0100" produces "0_0010". Subtracting the divisor's sign DS 12A from the partial remainder's sign XR 14A and adding in the carry out from the 4-bit subtract produces the value "0", which is the new remainder sign bit 30 REM_SIGN. The calculated partial remainder is shifted up by one bit-position, with the MSB of the result from OP2 being shifted to the new XR bit 14A'. The other 3 bits of the result from OP2 are shifted to the 3 MSB's for the new OP2 register 14'. The MSB of the MQ register 16, "0", is shifted to the LSB for the new OP2 register 14'. The other 3 LSB's of MQ register 16 are also shifted up to become the 3 MSB's for the new MQ register 16'. Thus the new partial remainder and the MQ register are shifted up by one bit-position.

The new reminder sign bit 30 is inverted by inverter 28 and loaded into the LSB for the new MQ register 16' as a quotient bit. If the partial remainder sign bit 30 was zero, then the partial reminder was positive, and subtracting the divisor for that iteration was correct. Thus a one should be placed in the quotient for that iteration. However, if the partial remainder's sign was one, indicating that the partial remainder is negative, then the divisor should not have been subtracted for that iteration, and the quotient bit for that iteration should be a zero.

The type of operation, add operation signal 34' (ADD_OP), for the next iteration is also calculated as the exclusive-OR (XOR) of the partial remainder sign bit 30 and the divisor's sign DS 12A.

FINAL RESTORE AND REMAINDER OVERFLOW DETECT—FIG. 6

Because non-restoring division is used, the partial remainder from the last iteration could be negative and have to be restored to a positive number. A negative partial remainder is restored to a positive remainder by performing another iteration without shifting the partial remainder. That is why the last iteration does not shift the partial remainder for the OP2 register, as shown in FIG. 4B. When the partial remainder is negative, its sign is a one, and ADD_OP is set to add a positive divisor or subtract a negative divisor. Thus the final restore will add the absolute value of the divisor. This will normally "un-do" the effect of the last iteration and change the negative partial remainder to a positive number. The inventor has realized that this change in the sign of the partial remainder can be used to detect an error condition called a remainder overflow.

Although the restore is not needed when the remainder from the last iteration is positive, the restore step in the present invention is always performed. When the remainder from the last iteration is positive, then the result from the restore will be discarded. The restore step is always performed so that remainder overflows are detected.

When the remainder from the last iteration is positive, its sign is a zero, and ADD_OP is set to subtract a positive divisor or add a negative divisor. Thus the final restore will subtract the absolute value of the divisor. This will also normally "un-do" the effect of the last iteration and change the sign of a positive or negative partial remainder.

Figure 6:
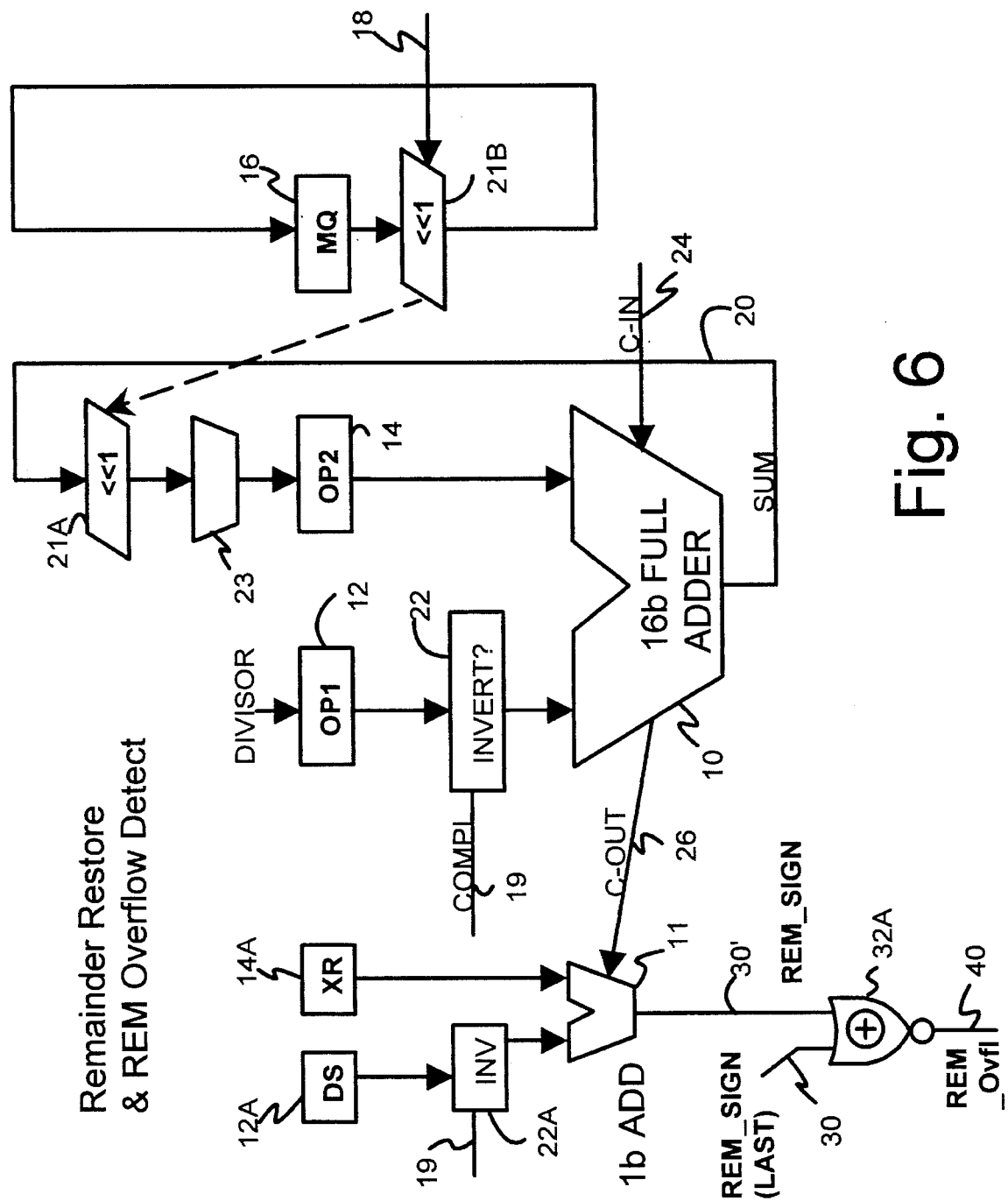
FIG. 6 shows how the apparatus of FIG. 1 is modified for the restore.

This restore is much like the iterations described above, which is an advantage because the control for the apparatus can be simplified. FIG. 6 shows how the apparatus of FIG. 1 is modified for the restore. The same reference numerals are used in FIG. 6 to refer to like elements. The major modification is that the remainder sign bit 30 from the last iteration is exclusive-OR'ed with the remainder sign bit 30' calculated in the restore step. If the sign bits 30, 30' are identical, then exclusive-NOR (XNOR) gate 32A will signal a remainder overflow REM_Ovfl 40. Normally, the remainder sign should change during the restore step because the remainder should be less than the divisor; otherwise the divisor should have been subtracted more times and the quotient should have been larger. When the remainder is larger than the divisor after the final iteration, this is known as a remainder overflow. The remainder has "overflowed" the divisor.

The shift logic is not used in the restore step, but is still present in FIG. 6 to show that the same hardware may be used for the restore.

FIG. 7 is a flowchart of the final restore and overflow detect step 120. The type of operation ADD_OP calculated in the last iteration determines if the divisor in OP1 register 12 is added or subtracted from the remainder from the last iteration. The n-bit adder 10 performs this add or subtract operation in the same manner as described for the iterations. Likewise, the 1-bit adder 11 computes the sum or difference of the divisor sign DS 12A and the remainder's sign in the XR register 14A with the carry out 26 from the n-bit adder 10. The result from the 1-bit adder is the new sign for the restored remainder 30'. This sign can be negative or positive.

However, the exclusive-NOR (XNOR) gate 32A has the remainder sign bit 30 from the last iteration as an input instead of the divisor's sign 12A. The result produced from gate 32A is the remainder overflow signal REM_Ovfl 40. This signal is low when the sign has changed, when either the remainder sign bit 30 from the last iteration was a one or the new remainder sign bit 30' from the restore was a one, but not both.

The remainder overflow is detected in step 121 of FIG. 7A. This step does not require a separate clock cycle as it is simply a delay through a single exclusive-NOR (XNOR) gate. It can normally be accomplished during the same clock cycle that the add or subtract is occurring, or the following cycle.

Thus the remainder overflow can be detected as simply the lack of a sign change for the restored remainder. This step is always used, even when the remainder does not have to be restored. The step is very similar to the iteration step, and thus the apparatus and control for remainder overflow and restore impose only a slight overhead and addition to the division apparatus.

Figure 7B:
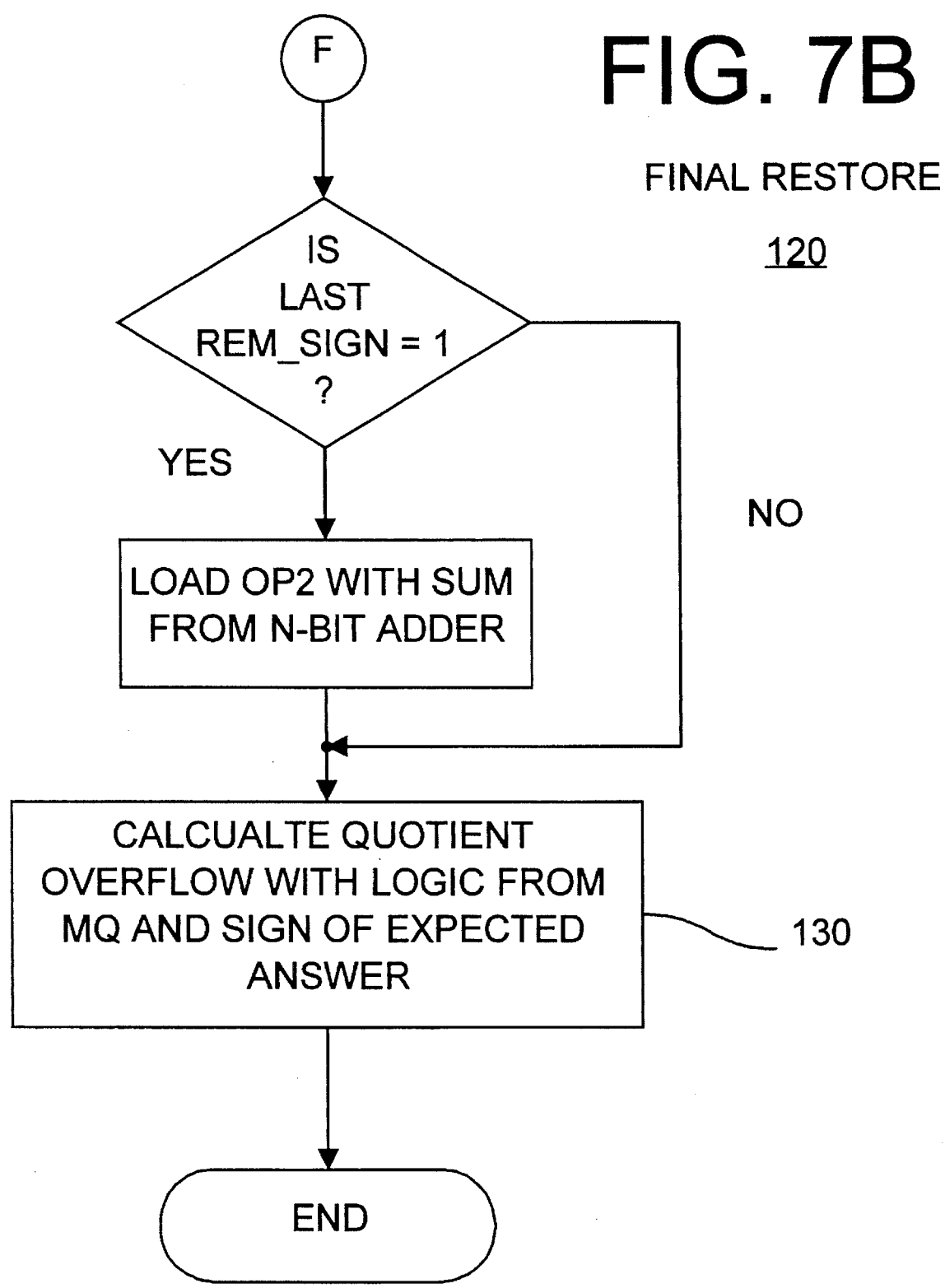

FIG. 7B shows that when the remainder sign bit 30 from the last iteration is one, indicating that the remainder is negative and should be restored, that the new remainder calculated in the restore step is loaded into OP2 register 14. However, when the remainder sign bit 30 from the last iteration is zero, indicating that the remainder is positive and should not be restored, then the new remainder is discarded. Instead the remainder from the last iteration which was stored into OP2 register 14 during that last iteration is kept.

QUOTIENT OVERFLOW DETECT

A quotient overflow is where the true quotient is larger in magnitude than the largest quotient representable by the number of bits in the quotient register. Quotient overflow can only occur with signed division; the quotient for unsigned division will always be representable by the bits in the quotient register. If the quotient has a zero for the MSB, then no overflow occurred, because the partial remainder sign after the first iteration was one, meaning that $2^{n-1}*|Divisor|>|Dividend|$. Quotient overflow can only occur for n/n division for MININT÷−1, or for divide by zero; it can occur in many ways for 2n/n division.

Thus a simple way to detect a quotient overflow is to signal an overflow when the MSB of the quotient is a one. This quotient is the quotient from the last iteration. Since the dividend was first converted to a positive number before the first iteration, and the divisor is added or subtracted during the iterations as if it were a positive number, the quotient should also be positive. Thus the sign bit, or MSB, of the quotient could be used to detect an overflow of the quotient.

There is only one special case where a quotient from the last iteration is negative and does not overflow: when the quotient is the minimum representable negative number, MININT. A peculiarity of the two's complement representation is that MININT can be represented only as a negative number, but not as a positive number. All other negative numbers can be complemented to a positive counterpart number. Thus for four-bit representation, 1000 represents −8, MININT. Positive eight cannot be represented. Thus if the quotient from the last iteration is MININT, an overflow may not have occurred. If the expected quotient is negative, then the quotient will be complemented to get the final quotient result. Complementing MININT will produce MININT, just as complementing zero will produce zero. Thus when the expected answer is negative, and the quotient is MININT, no quotient overflow has occurred. However, if the expected answer is positive, and the quotient from the last iteration is MININT, then a quotient overflow has occurred because MININT cannot be represented as a positive number.

Figure 8:
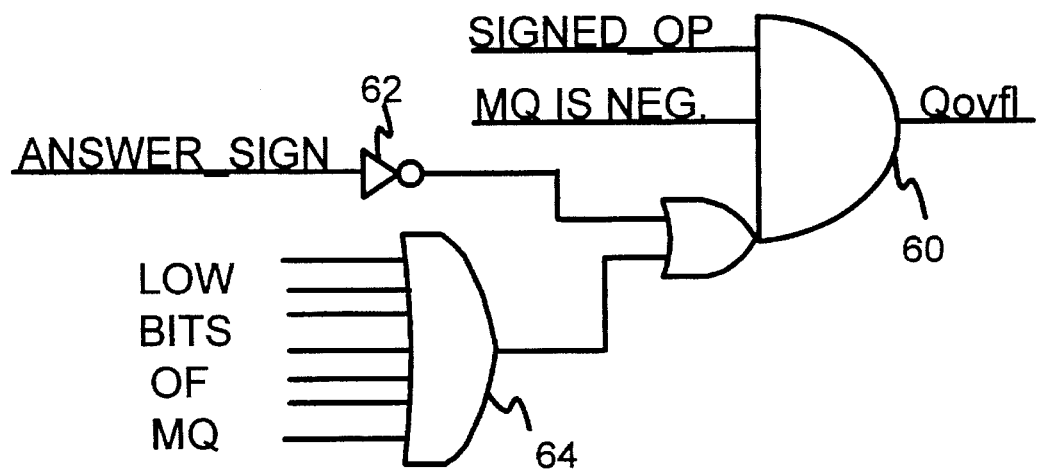
FIG. 8 shows a simple logic implementation for detection of quotient overflow

FIG. 8 shows a simple logic implementation for detection of quotient overflow. Quotient overflow is only possible for signed division, and thus the SIGNED_OP parameter is inputted to OR-AND gate 60. Likewise, a quotient overflow cannot occur when the quotient from the last iteration in the MQ register 16 is positive. Thus the MSB, or sign bit, from MQ register 16 is also input to OR-AND gate 60. If the expected answer is positive, and yet the quotient is negative, then a quotient overflow has occurred. Thus the expected answer sign ANSWER_SIGN is inverted by inverter 62 and input to OR-AND gate 60.

If the expected answer sign is negative, then there is only one special case where the quotient does not overflow: when the quotient is MININT. OR gate 64 OR's the low bits of the quotient from the last iteration that are stored in MQ register 16. These low bits are all of the bits except the MSB. Thus there are n-i inputs to OR gate 64. If all of these bits are zero, then a zero is sent to OR-AND gate 60. If the expected answer sign is one (the expected answer is negative), then the quotient overflow, Qovfl, is forced to zero. In all other cases the quotient overflow is signaled, such as if any of the low bits of the quotient are one (not MININT), or the expected answer is positive, while the quotient in MQ is negative.

FIG. 7B also shows a quotient overflow detect step 130. This detection is performed using the logic of FIG. 8 and thus may occur in time during the restore step. Thus a separate clock cycle is not required for quotient overflow detection. Since both the quotient overflow and the remainder overflow can be detected during the restore step, no separate time-steps are needed for overflow detection using the present invention.

SELECTIVE COMPLEMENTATION OF RESULTS

The restored remainder may need to be complemented during the final complement step 150 of FIG. 2. The remainder must have the same sign as the dividend. Thus the sign of the original dividend is used to determine if the remainder should be complemented. This final complement occurs after the final remainder restore step. When the partial remainder after the last iteration was negative, then the remainder complemented is the restored remainder that was loaded into OP2 register 14 during the restore step. Otherwise, it is the remainder from the last iteration that was stored in OP2 register 14.

The quotient from the last iteration may also need to be complemented during the final complement step 140 of FIG. 2. The quotient's sign must be the exclusive-OR of the signs of the dividend and divisor. The answer sign calculated during initialization (FIG. 3C step 104) is used to determine if the quotient should be complemented to a negative number. This final complement occurs after the final remainder restore step.

Complementation of either the remainder or quotient is performed on the same apparatus shown in FIG. 1. The remainder or quotient is input to the inversion logic 22 and then to adder 10. The second input to adder 10 is set to zero, while the carry-in input 24 is set to one. Thus the two's complement of the remainder or quotient is output as the sum 20 from adder 10. Alternately, the second input can be set to one and the carry-in 24 set to zero.

EXAMPLES

Several examples using n=4 bits are shown below with both positive and negative inputs. They also illustrate the special case of MININT when the expected answer is positive (example 3) or negative (example 4). A remainder overflow is shown in example 5.

Example 1

Sign Mismatch, Quotient Overflow

18/2 = 0001 0010 / 0010 = OP2 : MQ / OP1
Divisor sign = 0, ADD_OP = 0, XR = 0

| Iteration | XR | OP2 | MQ | ADD_OP | Comments |
|---|---|---|---|---|---|
|   |    | 0001 | 0010 |   | Load Dividend |
|   | 0  | 0010 | 0100 |   | Shift-Left 1 bit |
| 1 | −0 | −0010 |    | 0 | Subtract Divisor |
|   | 0  | 0000 |    |   |   |
|   | 0  | 0000 | 1001 |   | Shift result in (0' = 1) |
| 2 | −0 | −0010 |    | 0 | Subtract Divisor |
|   | 1  | 1110 |    |   |   |
|   | 1  | 1101 | 0010 | 1 | Shift result in (1' = 0) |
| 3 | +0 | +0010 |    | 1 | Add Divisor |
|   | 1  | 1111 |    |   |   |
|   | 1  | 1110 | 0100 | 1 | Shift result in (1' = 0) |
| 4 | +0 | +0010 |    | 1 | Add Divisor |
|   | 0  | 0000 |    |   |   |
|   | 0  | 0000 | 1001 | 0 | Shift result in to MQ |
|   |    |      |      | 0 |   |
| Restore | 0 | 0000 |    | 0 | Restore/Rovfl Test |
|   | −0 | −0010 |    | 0 | Try to Subtract Divisor |
|   | 1  | 1110 |    |   | XR changed; no Rovfl |

MQ (before complementation)=1001.
MQ is not MININT (1000) because low bits in MQ are not all=0.
MQ is negative because the sign bit, the MSB, is 1. However, the expected sign for the Quotient is positive (dividend sign XOR divisor sign). Therefore a quotient overflow for signed division has occurred and Qovfl=1.
The correct answer is 18/2=+9 Remainder 0. The MQ calculated is 9 unsigned but negative 7 signed. Thus the MQ result is correct for unsigned division, but incorrect for signed division. With signed division, a quotient overflow has occurred since the answer, 9, cannot be represented in 4 bits of two's complement format. The remainder, zero, is correct and did not overflow.

Example 2

Negative Quotient, Quotient Overflow
−18/2=1110 1110/0010
First complement −18 to +18 for use in iterations. Perform complement of quotient and remainder after all iterations complete.
+18/2=0001 0010/0010=OP2: MQ/OP1 Divisor sign=0, ADD_OP=0, XR=0, ANSWER_SIGN=1
The iterations and remainder overflow detect/restore steps are identical to the previous example once −18 is complemented to +18 for use in the iterations.
MQ (before complementation)=1001.

MQ is negative because the sign bit, the MSB, is 1. The expected sign for the Quotient (ANSWER_SIGN) is negative (dividend sign XOR divisor sign). The only negative quotient allowed is MININT, 1000. Since MQ is 1001, it is not MININT and a quotient overflow for signed division has occurred, so Qovfl=1.
The correct answer is −18/2=−9 Remainder 0. The MQ calculated is 9 unsigned but negative 7 signed. With signed division, a quotient overflow has occurred since the answer, −9, cannot be represented in 4 bits of two's complement format. The remainder, zero, is correct and did not overflow.

Example 3

Sign Mismatch, Quotient Overflow

16/2 = 0001 0000 / 0010 = OP2 : MQ / OP1
Divisor sign = 0, ADD_OP = 0, XR = 0

| Iteration | XR | OP2 | MQ | ADD_OP | Comments |
|---|---|---|---|---|---|
|   |    | 0001 | 0000 |   | Load Dividend |
|   | 0  | 0010 | 0000 |   | Shift-Left 1 bit |
| 1 | −0 | −0010 |   | 0 | Subtract Divisor |
|   | 0  | 0000 |   |   |   |
|   | 0  | 0000 | 0001 |   | Shift result in (0' = 1) |
| 2 | −0 | −0010 |   | 0 | Subtract Divisor |
|   | 1  | 1110 |   |   |   |
|   | 1  | 1100 | 0010 | 1 | Shift result in (1' = 0) |
| 3 | +0 | +0010 |   | 1 | Add Divisor |
|   | 1  | 1110 |   |   |   |
|   | 1  | 1100 | 0100 | 1 | Shift result in (1' = 0) |
| 4 | +0 | +0010 |   | 1 | Add Divisor |
|   | 1  | 1110 |   |   |   |
|   | 1  | 1110 | 1000 | 1 | Shift result in to MQ |
|   |    |      |      | 1 |   |
| Restore | 1 | 1110 |   | 1 | Restore/Rovfl Test |
|   | +0 | +0010 |   | 1 | Try to Add Divisor |
|   | 0  | 0000 |   |   | XR changed; no Rovfl |

MQ (before complementation)=1000.
MQ is negative because the sign bit, the MSB, is 1. However, the expected sign for the Quotient is positive (dividend sign XOR divisor sign). Therefore a quotient overflow for signed division has occurred and Qovfl=1.
The correct answer is 16/2=+8 Remainder 0. The MQ calculated is 8 unsigned but negative 8 signed. Thus the MQ result is correct for unsigned division, but incorrect for signed division. With signed division, a quotient overflow has occurred since the answer, 8, cannot be represented in 4 bits of two's complement format. The remainder, zero, is correct and did not overflow.

Example 4

Negative Sign Match, MININT, No Quotient Overflow
−16/2=1111 0000/0010
Complement −16 to +16 and use +16 in iterations and remainder restore step. After iterations and restore is complete, complement remainder and quotient.
16/2=0001 0000/0010=OP2: MQ/OP1 Divisor sign=0, ADD_OP=0. XR=0, ANSWER_SIGN=1
Same calculations as shown in previous example of +16/2.
MQ (before complementation)=1000.
MQ is MININT (1000) because low bits in MQ are all=0.

MQ is negative because the sign bit, the MSB, is 1. The expected sign for the Quotient is negative (dividend sign XOR divisor sign). For most negative numbers, the final complement would yield a positive quotient, which would have a sign mismatch and therefore a quotient overflow. However, the quotient, 1000, is MININT. When MININT is complemented, the result is also MININT. Both have a negative sign. Thus a sign mismatch will not occur. This is the MININT special case and Qovfl=0.

The correct answer is −16/2=−8 Remainder 0. The MQ calculated is 8 unsigned but negative 8 signed. Thus the MQ result is correct for signed division.

Example 5

Remainder Overflow

35/2 = 0010 0011 / 0010 = OP2 : MQ / OP1
Divisor sign = 0, ADD_OP = 0, XR = 0

| Iter-ation | XR | OP2 | MQ | ADD_OP | Comments |
|---|---|---|---|---|---|
|   |   | 0010 | 0011 |   | Load Dividend |
|   | 0 | 0100 | 0110 |   | Shift-Left 1 bit |
| 1 | −0 | −0010 |   | 0 | Subtract Divisor |
|   | 0 | 0010 |   |   |   |
|   | 0 | 0100 | 1101 |   | Shift result in (0' = 1) |
| 2 | −0 | −0010 |   | 0 | Subtract Divisor |
|   | 0 | 0010 |   |   |   |
|   | 0 | 0101 | 1011 |   | Shift result in (0' = 1) |
| 3 | −0 | −0010 |   | 0 | Subtract Divisor |
|   | 0 | 0011 |   |   |   |
|   | 0 | 0111 | 0111 |   | Shift result in (0' = 1) |
| 4 | −0 | −0010 |   | 0 | Subtract Divisor |
|   | 0 | 0101 |   |   |   |
|   | 0 | 0101 | 1111 | 0 | Shift result in to MQ |
|   |   |   |   | 0 |   |
| Re-store | 0 | 0101 |   | 0 | Restore/Rovfl Test |
|   | −0 | −0010 |   | 0 | Try to Subtract Divisor |
|   | 0 | 0011 |   |   | XR Didn't change; Rovfl |

MQ (before complementation)=1111.

MQ is negative because the sign bit, the MSB, is 1. However, the expected sign for the Quotient is positive (dividend sign XOR divisor sign). Therefore a quotient overflow for signed division has occurred and Qovfl=1.

The true correct answer is 35/2=+17 Remainder 1. The MQ calculated is 15 unsigned but negative 1 signed. Thus the MQ result is not correct for unsigned division or signed division. With signed division, a quotient overflow has occurred since the calculated quotient, 1111, has the wrong sign. The true answer, +17, cannot be represented in 4 bits of two's complement format. The calculated remainder, +3, is not correct since it is greater than the divisor, 2. Thus a remainder overflow is detected by the final remainder restore step because the sign did not change.

Note that a quotient overflow would have detected an error of the signed division. However, unsigned division would not have generated a quotient overflow. Indeed, the calculated quotient, 15, is representable as an unsigned 4-bit number. However, the remainder was too large; it was greater than the divisor. This produced a remainder overflow which was detected during the final remainder restore step.

MATHEMATICAL JUSTIFICATION FOR DIVISION METHOD

The divide algorithm is guaranteed to return the largest unsigned n-bit MQ such that abs(divisor)*MQ+remainder= abs(dividend), where abs() is the absolute value function. The remainder here is after the final remainder restore step (assuming the remainder is only updated if its sign changed from positive to negative). Thus, an n-bit/n-bit divide can never generate ROVFL (unless the divisor is zero) If the divisor is zero, then the MQ could not be the largest n-bit number satisfying the above. Furthermore for n-bit/n-bit, the QOVFL can only occur for signed divides, and only when MQ has exceeded the signed range; this in turn can only happen in two cases: MININT/−1 and when the divisor is zero.

In the 2n-bit/n-bit case, ROVFL and QOVFL cover all the overflow cases: if there's no ROVFL or QOVFL, then MQ is by definition the quotient. Conversely, both ROVFL and QOVFL imply that the quotient doesn't fit in n bits, with QOVFL only being needed for the signed case with its reduced range. In n-bit/n-bit, a divisor of zero will produce a quotient of all ones and a remainder equal to abs(dividend). This divide-by-zero case is detected with ROVFL: the sign of the remainder will not change when the divisor (0) is added to it.

C CODE FOR SIMULATION OF DIVISION APPARATUS

The addendum shows a simple embodiment written in the C programming language that simulates the division apparatus of the present invention. The embodiment in the addendum divides a 32-bit dividend by a 16-bit divisor when the "low_mode" parameter is false or zero. A 16-bit dividend is used when this "low_mode" parameter is true or one. Thus the embodiment performs 2n or n-bit division where n is 16 and 2n is 32.

When the dividend and divisor are unsigned, then the "unsigned_op" parameter is true. Signed division has the "unsigned_op" parameter set to false. This parameter is used to disable the quotient overflow generation "qovfl". The unsigned_op parameter is also used to set the dividend's sign bit DIVIDEND_SIGN and the divisor's sign bit DIVISOR_SIGN to zero or false when an unsigned division is performed. Selective complementation of the dividend is implicitly disabled by the dividend sign bit being set to zero by the unsigned_op parameter.

A simulated 16-bit adder generates the variable "sum" while the 17th bit or MSB is added as the sum of the XR bit of the dividend and the sign of the divisor, DIVISOR_

SIGN, which produces the remainder sign bit REMAINDER_SIGN.

UNSIGNED DIVISION

Unsigned division can be performed on the same division apparatus with only minor accommodations. For unsigned division, the divisor sign is always forced to zero and the dividend is not complemented. Overflow is detected by the final remainder restore step as a remainder overflow. A quotient overflow cannot occur and the quotient overflow signal is disabled. Thus only simple changes are necessary for unsigned division.

ALTERNATE EMBODIMENTS

Several other embodiments are contemplated by the inventor. For example OP1 register 12, 0172 register 14, and MQ register 16 may be implemented as part of the general-purpose registers (GPR's) of the processor, or they may be discrete registers in or near the ALU. The adder may be n+1 bits wide, or only n bits wide with the last bit implemented in logic or a separate 1-bit adder. The width, n, may be 16, 32, or even 64 or more bits, depending upon the implementation. The detailed description and its examples often used 4-bit examples for clarity, while the addendum uses n=16 bits. Other widths are anticipated as being more useful and still embody the spirit of the invention.

Higher-speed division systems may calculate more than one quotient bit per iteration. This can be accomplished with additional hardware that calculates two or more quotient bits in a single iteration. The invention may also be applied to these systems.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

---

ADDENDUM - C CODE FOR DIVIDE APPARATUS

```
/*
 * divide:
 * Divide a 32-bit number by a 16-bit number producing a 16-bit quotient and
 * a 16-bit remainder and return an overflow indication
 */
BOOLEAN divide (unsigned dividend, unsigned divisor, BOOLEAN unsigned_op,
                BOOLEAN low_mode, unsigned *quot, unsigned *rem)
{
    unsigned    OP1, OP2, MQ, sum;
    unsigned    CNT;
    BOOLEAN     DIVISOR_SIGN, DIVIDEND_SIGN, ANSWER_SIGN,
                REMAINDER_SIGN, XR,
                ADD_OP;
    BOOLEAN     qovfl, rovfl, cout, last;
    if (low_mode) {
/*for low-only case, can get DIVIDEND_SIGN while doing selective complement */
DIVIDEND_SIGN = ((!unsigned_op && (dividend & 0x8000)) ? 1 : 0);
/* selective complement of negative dividend */
sum = (DIVIDEND_SIGN ? (((~dividend) & 0xffff) + 1) : dividend);
XR = 0;
OP2 = ((sum & 0x8000) ? 1 : 0);
MQ = ((sum << 1) & 0xffff);
    }
    else {
/* for 2n divide, need to look at top word first just to get sign -- extra STEP */
DIVIDEND_SIGN = ((!unsigned_op && ((dividend >> 16) & 0x8000)) ? 1 : 0);
/* selective complement of negative dividend -- if 2n, need to
complement low word, then high */
sum = (DIVIDEND_SIGN ? (((~dividend) & 0xffff) + 1) : dividend);
cout = ((sum & 0x10000) ? 1 : 0);
MQ = sum & 0xffff;
/* now process high word -- note carry between low and high */
sum = (!unsigned_op && DIVIDEND_SIGN ? ((~(dividend >> 16)) + cout):
                (dividend >> 16));
XR = ((sum & 0x8000) ? 1 : 0);
OP2 = (((sum << 1) & 0xfffe) | ((MQ & 0x8000) ? 1 : 0));
MQ = ((MQ << 1) & 0xffff);
    }
        OP1 = (divisor & 0xffff);
        REMAINDER_SIGN = 0;
        DIVISOR_SIGN = ((!unsigned_op && (divisor & 0x8000)) ? 1 : 0);
        ANSWER_SIGN = DIVISOR_SIGN ^ DIVIDEND_SIGN;
        ADD_OP = DIVISOR_SIGN ^ REMAINDER_SIGN;
        CNT = 0;
/* Main Iterations Loop Below */
do {
    last = (CNT == 15);
    sum = (ADD_OP ?
        (((XR << 16) | OP2) + ((DIVISOR_SIGN << 16) | OP1)) :
        (((XR << 16) | OP2) - ((DIVISOR_SIGN << 16) | OP1)));
    REMAINDER_SIGN = ((sum & 0x10000) ? 1 : 0);
    XR - ((sum & 0x8000) ? 1 : 0);
    OP2 = (last ? (sum & 0xffff) : (((sum << 1) & 0xfffe) | ((MQ & 0x8000) ? 1 :
```

ADDENDUM - C CODE FOR DIVIDE APPARATUS

```
            0)));
    MQ = (((MQ << 1) | !REMAINDER_SIGN) & 0xffff);
    ADD_OP = DIVISOR_SIGN ^ REMAINDER_SIGN;
  } while (++CNT < 16);
  /* overflow detection and possible assignment to remainder if negative */
    sum = (ADD_OP ?
      (((REMAINDER_SIGN << 16) | OP2) + ((DIVISOR_SIGN << 16) | OP1)) :
      (((REMAINDER_SIGN << 16) | OP2) - ((DIVISOR_SIGN << 16) | OP1)));
    rovfl = (((sum & 0x10000) ? 1 : 0) ^ !REMAINDER_SIGN);
    OP2 = (REMAINDER_SIGN ? (sum & 0xffff) : OP2);
    /* selective complement of remainder based on dividend sign */
    *rem = (DIVIDEND_SIGN ? ((- OP2) & 0xffff): OP2);
    /* selective complement of MQ to produce quotient */
    qovfl = (!unsigned_op && (MQ & 0x8000) && (!ANSWER_SIGN || ((MQ &
        0x7fff) != 0)));
    *quot = (ANSWER_SIGN ? ((- MQ) & 0xffff) : MQ);
  return (rovfl || qovfl);
}
```

I claim:

1. An overflow detection apparatus for detecting a remainder overflow in an integer division sequence of a dividend divided by a divisor, the integer division sequence having a plurality of iterations including a last iteration, the last iteration producing a last partial remainder having a last remainder sign, the last remainder sign being positive or negative, the overflow detection apparatus comprising:

final restore means, receiving the last partial remainder and the last remainder sign, for restoring the last partial remainder, the final restore means subtracting an absolute value of the divisor from the last partial remainder and outputting a difference as a result if the last remainder sign is positive, the final restore means adding the absolute value of the divisor to the last partial remainder and outputting a sum as the result if the last remainder sign is negative, the result having a result sign indicating if the result is positive or negative;

select means, receiving the result from the final restore means and the last remainder sign, for selecting as a final remainder the result from the final restore means if the last remainder sign is negative, and for selecting as the final remainder the last partial remainder if the last remainder sign is positive; and overflow detect means, receiving the last remainder sign and the result sign, for signaling the remainder overflow when the last remainder sign and the result sign are both positive or both negative;

whereby the remainder overflow is detected from the result sign from the final restore means and the last remainder sign.

2. The apparatus of claim 1 further comprising:

dividend sign means for indicating if the dividend is a negative signed number; and remainder complementing means, receiving the final remainder, for outputting the two's complement of the final remainder if the dividend sign means indicates that the dividend is a negative signed number, whereby the apparatus outputs a final remainder having the same sign as the dividend.

3. The apparatus of claim 1 further comprising:

divisor sign means for storing a divisor sign, the divisor sign being negative to indicate that the divisor is a negative signed number, the divisor sign being positive to indicate that the divisor is a positive signed number or an unsigned number;

operation type means, receiving the divisor sign, for indicating if the divisor should be added or subtracted in a next iteration, the operation type means indicating that the divisor be subtracted if the divisor sign and a current sign of a partial remainder in a current iteration are both positive or both negative;

shift means for shifting the partial remainder in the current iteration to the left by one bit-position, producing a shifted partial remainder; and iteration means, coupled to the operation type means and receiving the shifted partial remainder, for calculating a next partial remainder, the next partial remainder being the difference between the partial remainder and the divisor if the operation type means indicates that the divisor be subtracted, the next partial remainder being the sum of the partial remainder and the divisor if the operation type means indicates that the divisor be added, whereby the divisor sign is used to determine if the divisor is added or subtracted during each iteration, eliminating a need to complement a negative divisor during initialization.

4. The apparatus of claim 3 wherein the operation type means is an exclusive-OR (XOR) gate receiving the divisor sign and the current sign of the partial remainder in the current iteration, an output of the XOR gate indicating if the divisor should be added or subtracted in the next iteration.

5. The apparatus of claim 1 further comprising:

a divisor sign, the divisor sign being negative if the divisor is a negative signed number, the divisor sign being positive if the divisor is a positive signed number or an unsigned number;

a dividend sign, the dividend sign being negative if the dividend is a negative signed number, the dividend sign being positive if the dividend is a positive signed number or an unsigned number;

expected quotient sign means, receiving the divisor sign and the dividend sign, for indicating an expected sign of a quotient, the expected sign being positive if the divisor sign and the dividend sign are both positive or both negative quotient overflow detect means, receiving a last quotient from the last iteration, for signaling a quotient overflow if:

(a) the last quotient is negative, and (b) signed division is being performed, and (c) a special case is not indicated;

special case indicating means, receiving the expected sign of the quotient and the last quotient, for indicating the special case when the expected sign of the quotient is negative and the last quotient is a minimum signed integer representable;

whereby overflow for signed integer division is signaled by the remainder overflow or the quotient overflow.

6. The apparatus of claim 5 wherein the minimum signed integer representable is a number having a binary one as a most-significant bit and all other binary bits being zero.

7. The apparatus of claim 5 further comprising:

quotient complementing means, receiving the last quotient, for outputting the two's complement of the last quotient if the expected quotient sign means indicates that expected sign of the quotient is negative, whereby quotient overflow for signed division is detected and a signed quotient is output.

8. The apparatus of claim 5 further comprising:

signed operation means, coupled to the quotient overflow detect means and the expected quotient sign means, for indicating that signed integer division is to be performed.

9. The apparatus of claim 5 wherein the divisor is n binary bits in width and further comprising:

low mode means for indicating if the dividend is n binary bits in width or 2n binary bits in width;

selective complement means, receiving the dividend and the dividend sign, for outputting a two's complement of the dividend if the dividend sign bit is negative, the selective complement means outputting a selectively complemented dividend, and extending means for zero-extending the selectively complemented dividend to 2n bits if the low mode means indicates that the dividend is n binary bits in width, the extending means outputting a selectively complemented and extended dividend to an iteration means.

10. An integer division apparatus for dividing a dividend by a divisor, the apparatus comprising:

divisor sign means for storing a divisor sign, the divisor sign being negative to indicate that the divisor is a negative signed number, the divisor sign being positive to indicate that the divisor is a positive signed number or an unsigned number;

operation type means, receiving the divisor sign, for indicating if the divisor should be added or subtracted in a next iteration, the operation type means indicating that the divisor be subtracted if the divisor sign and a current sign of a partial remainder in a current iteration are both positive or both negative;

shift means for shifting the partial remainder in the current iteration to the left by one bit-position, producing a shifted partial remainder; and iteration means, coupled to the operation type means and receiving the shifted partial remainder, for calculating a next partial remainder, the next partial remainder being the difference between the partial remainder and the divisor if the operation type means indicates that the divisor be subtracted, the next partial remainder being the sum of the partial remainder and the divisor if the operation type means indicates that the divisor be added;

an integer division sequence, the integer division sequence having a plurality of iterations including a last iteration, the last iteration producing a last partial remainder having a last remainder sign, the last remainder sign being positive or negative;

final remainder restore means, receiving the last partial remainder and the last remainder sign, for restoring the last partial remainder, the final remainder restore means subtracting an absolute value of the divisor from the last partial remainder and outputting the difference as a result if the last remainder sign is positive, the final remainder restore means adding the absolute value of the divisor to the last partial remainder and outputting the sum as the result if the last remainder sign is negative, the result having a result sign indicating it the result is positive or negative;

select means, receiving the result from the final remainder restore means and the last remainder sign, for selecting as a final remainder the result from the final remainder restore means if the last remainder sign is negative, and for selecting as the final remainder the last partial remainder if the last remainder sign is positive; and overflow detect means, receiving the last remainder sign and the result sign, for signaling a remainder overflow when the last remainder sign and the result sign are both positive or both negative, whereby the divisor sign is used to determine if the divisor is added or subtracted during each iteration, eliminating a need to complement a negative divisor during initialization and whereby the remainder overflow is detected from the result sign from the final remainder restore means and the last remainder sign.

11. The apparatus of claim 10 wherein the operation type means is an exclusive-OR (XOR) gate receiving the divisor sign and the current sign of the partial remainder in the current iteration, an output of the XOR gate indicating if the divisor should be added of subtracted in the next iteration.

12. An overflow detection apparatus for detecting a quotient overflow in an integer division sequence of a dividend divided by a divisor, the integer division sequence having a plurality of iterations including a last iteration, the overflow detection apparatus comprising:

a divisor sign, the divisor sign being negative if the divisor is a negative signed number, the divisor sign being positive if the divisor is a positive signed number or an unsigned number;

a dividend sign, the dividend sign being negative if the dividend is a negative signed number, the dividend sign being positive if the dividend is a positive signed number or an unsigned number;

expected quotient sign means, receiving the divisor sign and the dividend sign, for indicating an expected sign of a quotient, the expected sign being positive if the divisor sign and the dividend sign are both positive or both negative quotient overflow detect means, receiving a last quotient from the last iteration, for signaling a quotient overflow if:

(a) the last quotient is negative, and (b) signed division is being performed, and (c) a special case is not indicated; and special case indicating means, receiving the expected sign of the quotient and the last quotient, for indicating the special case when the expected sign of the quotient is negative and the last quotient is a minimum signed integer representable;

whereby quotient overflow for signed integer division is signaled by the quotient overflow.

13. The apparatus of claim 12 wherein the minimum signed integer representable is a number having a binary one as the most-significant bit and all other binary bits being zero.

14. The apparatus of claim 12 further comprising:

quotient complementing means, receiving the last quotient, for outputting the two's complement of the last quotient if the expected quotient sign means indicates that expected sign of the quotient is negative, whereby quotient overflow for signed division is detected and a signed quotient is output.

15. The apparatus of claim 12 further comprising:

signed operation means, coupled to the quotient overflow detect means and the expected quotient sign means, for indicating that signed integer division is to be performed.

16. The apparatus of claim 12 wherein the divisor is n binary bits in width and further comprising:

low mode means for indicating if the dividend is n binary bits in width or 2n binary bits in width;

selective complement means, receiving the dividend and 'the dividend sign, for outputting a two's complement of the dividend if the dividend sign bit is negative, the selective complement means outputting a selectively complemented dividend, and extending means for zero-extending the selectively complemented dividend to 2n bits if the low mode means indicates that the dividend is n binary bits in width, the extending means outputting a selectively complemented and extended dividend to an iteration means.

17. The apparatus of claim 12 wherein the last iteration produces a last partial remainder having a last remainder sign, the last remainder sign being positive or negative.

* * * * *